United States Patent
Unno

(10) Patent No.: US 9,948,185 B2
(45) Date of Patent: Apr. 17, 2018

(54) FAST-TRANSIENT SWITCHING CONVERTER WITH TYPE III COMPENSATION

(71) Applicant: Dialog Semiconductor (UK) Limited, London (GB)

(72) Inventor: Naoyuki Unno, Kanagawa (JP)

(73) Assignee: Dialog Semiconductor (UK) Limited, London (GB)

( * ) Notice: Subject to any disclaimer, the term of this patent is extended or adjusted under 35 U.S.C. 154(b) by 35 days.

(21) Appl. No.: 15/178,656

(22) Filed: Jun. 10, 2016

(65) Prior Publication Data
US 2017/0358984 A1 Dec. 14, 2017

(51) Int. Cl.
*H02M 3/158* (2006.01)
*H02M 1/08* (2006.01)

(52) U.S. Cl.
CPC .......... *H02M 3/158* (2013.01); *H02M 1/08* (2013.01)

(58) Field of Classification Search
CPC . G05F 1/445; G05F 1/455; G05F 1/66; G05F 1/452; G05F 1/59; G05F 1/56; G05F 1/575; G05F 1/465; G05F 1/565; G05F 1/595; G05F 1/573; G05F 1/563; G05F 1/569; G05F 1/5735; G05F 1/567;
(Continued)

(56) References Cited

U.S. PATENT DOCUMENTS 7,253,593 B1 8/2007 Chen et al.
7,586,767 B1 9/2009 Prodic et al.
(Continued)

FOREIGN PATENT DOCUMENTS

DE  10 2013 111 988    5/2014
WO  WO 2016/038601    3/2016

OTHER PUBLICATIONS

Analog Circuit Design, Low Voltage Low Power; Short Range Wireless Front-Ends; Power Management and DC-DC, Copyright 2012, pp. 321-338, Springer Dordrecht Heidelberg London New York, ISBN 978-94-007-1925-5.
(Continued)

*Primary Examiner* — Jue Zhang
*Assistant Examiner* — Kevin H Sprenger
(74) *Attorney, Agent, or Firm* — Saile Ackerman LLC; Stephen B. Ackerman; Billy Knowles

(57) ABSTRACT

A circuit configured for improving the large signal response of a control stage circuit of a switch mode DC/DC power converter by increasing the differential input range of an error amplifier by segmenting and adding an offset to the error amplifier input and output. When a transient is detected, the feedback voltage is offset in multiple segments by multiple offset voltage sources to prevent saturation of the control stage circuit. Counteracting offset voltages are added to an output of an error amplifier to prevent overshoot or undershoot. A feed-forward compensation signal is generated with the amplitude of the signal being clamped to fixed voltage levels between a minimum and a maximum amplitude of the feed-forward compensation signal. The feed-forward compensation signal is added to the output of the error amplifier to produce an output error signal of the control stage circuit configured for controlling the modulating of the switch mode DC/DC power converter.

25 Claims, 15 Drawing Sheets

(58) Field of Classification Search
CPC ....... G05F 1/46; H02M 3/158; H02M 3/1588;
H02M 3/1584; H02M 3/156; H02M
3/1582; H02M 3/33507; H02M 3/33515;
H02M 3/073; H02M 3/157; H02M
3/1563; H02M 2001/0009; H02M
2001/0012; H02M 2001/0025; H02M
2001/0032; H02M 2001/0045; H02M
1/081; H02M 1/0845; H02M 5/293;
H02M 5/2573; Y02B 70/16; Y02B
70/1466
USPC .................. 323/237, 241–244, 246, 268–288
See application file for complete search history.

(56) References Cited

U.S. PATENT DOCUMENTS

| | | |
|---|---|---|
| 7,605,576 B2 | 10/2009 | Kanakubo |
| 7,622,820 B1 | 11/2009 | Prodic et al. |
| 7,834,608 B2 | 11/2010 | Cheng et al. |
| 8,036,762 B1 | 10/2011 | Young et al. |
| 8,698,463 B2 | 4/2014 | Dwarakanath et al. |
| 2009/0278516 A1 | 11/2009 | Bhagwat et al. |
| 2011/0018507 A1 | 1/2011 | McCloy-Stevens et al. |
| 2012/0038334 A1 | 2/2012 | Peng et al. |
| 2014/0002044 A1 | 1/2014 | Babazadeh et al. |
| 2014/0021930 A1 | 1/2014 | Liu et al. |
| 2015/0278516 A1* | 10/2015 | Caprioli .............. G06F 9/30145 726/22 |

OTHER PUBLICATIONS

"Near-Optimum Dynamic Regulation of DC-DC Converters Using Feed-Forward of Output Current and Input Voltage with Current-Mode Control," by Richard Redl et al., IEEE Transactions on Power Electronics, vol. PE-1, No. 3, Jul. 1986, pp. 181-192.

"Optimal Feed-Forward Compensation for PWM DC/DC Converters with "Linear" and "Quadratic" Conversion Ratio," by Luigi Calderone et al., IEEE Transactions on Power Electronics, vol. 7, No. 2, Apr. 1992, pp. 349-355.

"Optimizing the Load Transient Response of the Buck Converter," by Richard Redl et al., IEEE Applied Power Electronics Conference and Exposition, 1998. APEC '98. Thirteenth Annual Conference Proceedings 1998, (vol. 1), Feb. 15, 1998, pp. 170-176.

"Hybrid Buck-Boost Feedforward and Reduced Average Inductor Current Techniques in Fast Line Transient and High-Efficiency Buck-Boost Converter," IEEE Transactions on Power Electronics, vol. 25, No. 3, by Ping-Ching Huang et al., Mar. 2010, pp. 719-730.

"Demystifying Type II and Type III Compensators Using Op-Amp and OTA for DC/DC Converters," Texas Instruments Application Report SLVA662, Jul. 2014, pp. 1-15, SW Lee, Power Management.

"Area- and Power-Efficient Monolithic Buck Converters With Pseudo-Type III Compensation," by Patrick Y. Wu et al., IEEE Journal of Solid-State Circuits, vol. 45, No. 8, Aug. 2010, pp. 1446-1455.

Co-pending U.S. Appl. No. 15/064,676, filed Mar. 9, 2016, "Type III Switching Converter Error Amplifier With Fast Transient Response Behavior," by Naoyuki Unno et al., 31 pgs.

German Office Action, File Number: 10 2016 213 987.8, Applicant: Dialog Semiconductor (UK) Limited, dated Apr. 19, 2017, 8 pgs., and English language translation, 9 pgs.

\* cited by examiner

FAST-TRANSIENT SWITCHING CONVERTER WITH TYPE III COMPENSATION

RELATED PATENT APPLICATIONS

U.S. patent application Ser. No. 15/064,676, filed on Mar. 9, 2016 assigned to the same assignee as the present invention, and incorporated herein by reference in its entirety.

TECHNICAL FIELD

This disclosure relates generally to differential error amplifiers. More particularly, this disclosure relates to differential error amplifiers having a fast transient response. Even more particularly, this disclosure relates to an error amplifier within a control stage circuit of a DC/DC switching power converter.

BACKGROUND

Type III compensation is often used for the voltage-mode control DC/DC switching power converter to achieve wider bandwidth than the inductor-capacitor (LC) resonant frequency of the DC/DC switching power converter. "Demystifying Type II and Type III Compensators Using Op-Amp and OTA for DC/DC Converters", S. W. Lee, Texas Instruments Application Report—SLVA662, July, 2014, states that the purpose of adding compensation to the error amplifier of a DC/DC switching power converter is to counteract some of the gains and phases contained in the control-to-output transfer function. The gains and phases may jeopardize the stability of the DC/DC switching power converter. The ultimate goal is to make the overall closed-loop-transfer function (control-to-output cascaded with the error amplifier) satisfy the stability criteria.

A Type I compensation has a single pole based on a feedback capacitor and resistor at the input of an operational amplifier or an impedance at an output of an operational transconductance amplifier with the resistor or resistors at the input of the operational transconductance amplifier. A Type II compensation has two poles and adds a resistor-capacitance (RC) branch to flatten the gain, and improve the phase response in the mid-frequency range. The increased phase is achieved by increasing the separation of the pole and zero of the compensation. A Type III compensation has two poles, besides the pole-at-zero and two zeros. The Type III compensation is used when more than 90 degrees of phase boost is necessary. By adding another pole/zero pair to the Type II compensation, the Type III compensation can theoretically boost the phase up to 180 degrees.

FIG. 1a is a block diagram of a switch mode DC/DC power converter. FIG. 1b is a schematic diagram of a control stage circuit 5 of the related art of the switch mode DC/DC power converter of FIG. 1a. Referring to FIG. 1a, a switch mode DC/DC power converter transfers power from a source $V_{IN}$ to a load while converting voltage and current applied to the input of the circuit to an output voltage $V_{OUT}$ and current $I_{out}$ suitable for the load. The switch mode DC/DC power converter consists of a control stage circuit 5 and a power stage 10. The control stage circuit 5 receives necessary feedback signals from the power stage 10 and a reference voltage $V_{REF}$ and control signals from system operating functions. The feedback signal $V_{FB}$ is applied to a compensator 20 to correct the phase and gain of the feedback signal $V_{FB}$. The compensated feedback signal $V_{CTRL}$ is applied to an error amplifier 15 for determining the difference between the compensated feedback signal $V_{CTRL}$ and the reference voltage $V_{REF}$. The output terminal 7 of the error amplifier 15 transfers the difference output voltage $V_{DIF}$ to be applied to the modulator 25 of the power stage 10. The modulator 25 compares the difference output voltage $V_{DIF}$ with a ramp voltage $V_{RAMP}$ to determine a pulse width of the modulated input voltage $V_{MOD}$. The modulated input voltage $V_{MOD}$ is applied to the filter 35 for removing the high frequency content from the modulated input voltage $V_{MOD}$ for determining the output voltage $V_{OUT}$ of the switch mode DC/DC power converter.

Referring to FIG. 1b, the error amplifier 15 of the control stage circuit 5 has a transconductance amplifier 17. The transconductance amplifier 17 receives the feedback signal $V_{FB}$ at its inverting terminal (−) and the reference voltage $V_{REF}$ at its non-inverting terminal (+). The output of the transconductance amplifier 17 is connected to a first terminal of the feed-forward resistor $R_{ff}$ and the first terminal of the compensation capacitor $C_c$. The second terminal of the compensation capacitor $C_c$ is connected to the ground reference voltage. The second terminal of feed forward resistor $R_{ff}$ is connected to summation node 16 at the output of the error amplifier 15. The summation node 16 is a single connection for combining the output signal $V_{OEA}$ of the error amplifier 15 with the output signal $V_{COMP}$ of the compensator 20. The summation of the output signal $V_{OEA}$ of the error amplifier 15 and the output signal $V_{COMP}$ of the compensator 20 provides the difference output voltage $V_{DIF}$ to terminal 7 for transmission the power stage 10.

The compensator 20 adds feed-forward compensation that increase the phase margin, defined as the difference between the unity-gain phase shift and −180 degrees, which is the point where the loop becomes unstable.

The finite gain or low gain amplifier 22 receives the feedback signal $V_{FB}$ at its inverting terminal (−) and the reference voltage $V_{REF}$ at its non-inverting terminal (+). The output of the finite gain amplifier 22 is connected to the first terminal of the feed-forward capacitor $C_{ff}$. The second terminal of the feed-forward capacitor $C_{ff}$ is connected to the second terminal of the feed forward resistor $R_{ff}$ and connected to the output terminal 7 of the error amplifier 15 for providing the difference output voltage $V_{DIF}$ to the power stage 10.

FIG. 1c is a plot of gain and phase vs. frequency of the control stage circuit 5 of the related art of the switch mode DC/DC power converter of FIG. 1a. The plot 40 is the gain of the error amplifier 15 and the plot 45 is the gain of the compensator 20. The total gain of the control stage circuit 5 is shown in the plot 50. The compensator 20 forms a Type III compensation that is often used for the switch mode DC/DC power converter to achieve wider bandwidth than the load inductor-capacitor (LC) resonant frequency. The two zeros 55 cancel the resonant frequency of the inductor and output capacitor, and 0-dB frequency of the whole control stage circuit 5 can be higher than the resonant frequency. However, the feed-forward path of the compensator 20 is effective only during the feed-forward pole time constant (about 3 $C_{ff} R_{ff}$) and also the dynamic range is limited by the power supply voltage source VDD.

FIG. 2 is a plot of the large signal response of the error amplifier 15 and output voltage $V_{OUT}$ of the switch mode DC/DC power converter of FIG. 1a employing the control stage circuit of the related art of FIG. 1b. The plot 65 shows the output voltage $V_{OC}$ response of the compensator 20 to a large a load and/or line transient. The plot 70 shows the output voltage $V_{OEA}$ of the error amplifier 15 and the plot 75 illustrates the output voltage $V_{DIF}$ of the control stage circuit 5. The output voltage $V_{DIF}$ of the control stage circuit 5 is the difference voltage between the reference voltage $V_{REF}$ and the voltage level of the compensated feedback signal $V_{CTRL}$.

When a load and/or line transient is large and/or long and the output voltage $V_{OUT}$ cannot be regulated while the feed-forward path of the compensator 20 is effective, the transient speed is restricted by the main pole, which is very slow, and an overshoot or undershoot 80 of the output voltage $V_{OUT}$ during the transient becomes large in the time prior to the time $\tau_0$. When the output voltage $V_{OC}$ response of the compensator 20 no longer increases, the output voltage $V_{OEA}$ of the error amplifier 15 begins to dominate at the time $\tau_0$ and the output voltage $V_{OUT}$ of the switch mode DC/DC power converter begins to raise to its required voltage level and the switch mode DC/DC power converter becomes regulated at the time $\tau_1$.

"Area- and Power-Efficient Monolithic Buck Converters with Pseudo-Type III Compensation," Wu, et al., IEEE Journal of Solid-State Circuits, vol. 45, no. 8, pp.: 1446-1455, August 2010, describes monolithic PWM voltage-mode buck converters with novel Pseudo-Type III (PT3) compensation. The compensation maintains the fast load transient response of the conventional Type III compensator; while the Type III compensator response is synthesized by adding a high-gain low-frequency path (via error amplifier) with a moderate-gain high-frequency path (via bandpass filter) at the inputs of PWM comparator. Found Jan. 20, 2016 at: URL: http://ieeexplore.ieee. org/stamp/stamp.jsp?tp=&arnumber=5518483&isnumber=5518480

SUMMARY

An object of this disclosure is to provide a circuit configured for providing a faster transient response time of a switch mode DC/DC power converter and so that less overshoot or undershoot of the output voltage of the switch mode DC/DC power converter occurs when a load and/or line transient signal is large.

Another object of this disclosure is to provide a circuit and method for monitoring an input terminal of a control stage circuit of a switch mode DC/DC power converter to detect if a large load and/or line transient signal occurs.

Further another object of this disclosure is to provide a circuit and method for increasing the differential input range of the error amplifier of a control stage circuit of a switch mode DC/DC power converter.

To accomplish at least one of these objects, a control stage circuit within a switch mode DC/DC power converter has a control loop monitor, a programmable feedback voltage offset generator, an error amplifier current offset generator, and a feed-forward compensation circuit. The control loop monitor configured for monitoring a difference between an offset feedback voltage developed from the output voltage of the switch mode DC/DC power converter and offset by the feedback voltage offset generator and a reference voltage. When the input voltage monitor detects a large differential between the offset feedback voltage and the reference voltage, an offset voltage is generated to be added to an input of the control stage circuit and an offset current is generated to be added to the output of the error amplifier. The output of the feed-forward amplifier is selectively connected to one feed-forward capacitor of the multiple feed-forward capacitors. One feed-forward voltage source is connected to another feed-forward capacitor of a group of multiple feed-forward capacitors to set the output of the feed-forward amplifier to a fixed voltage level to cause the output of the error amplifier to minimize the disturbance to the error amplifier output by segment transitions.

The control loop monitor has a first offset voltage source and a second offset voltage source. A negative terminal of the first offset voltage source is connected to receive the reference voltage and the positive terminal of the first offset voltage source is connected to an inverting terminal of a first comparator circuit. A positive terminal of the second offset voltage source is connected to receive the reference voltage and the negative terminal of the second offset voltage source is connected to an inverting terminal of a second comparator circuit. The first and second offset voltage sources set positive and negative voltage boundaries for the offset feedback voltage. The offset feedback voltage is applied to the non-inverting terminals of the first and second comparators. When a large line and/or load transient occurs at the input voltage terminal or the output terminal of the switch mode DC/DC power converter, one of the first or second comparators will be activated and the output terminal of the activated comparator will have a signal level of a first logic state and the output terminal of the deactivated comparator will have a signal level of a second logic level. The output signal levels of the first and second comparators are decoded by a control loop monitor logic circuit that determines if any line and/or load transient is a large increase or a large decrease. The control loop monitor logic circuit generates output control signals for generating more or less offset voltage to change the offset of the feedback voltage. Further, the control signals will modify the offset current of the error amplifier of the control stage circuit of the switch mode DC/DC power converter. Additionally, the control signals will select the at least one additional feed-forward capacitor that is added between the feed-forward amplifier output and the error amplifier output.

In various embodiments, the programmable feedback offset generator includes a resistive voltage divider with a first input terminal receiving the feedback signal and second input terminal connected to the ground reference voltage source. The resistive divider has multiple serially connected resistors. A first adjustable current source for generating the offset feedback voltage of a first polarity (positive) has a first terminal connected to the power supply voltage source and a second terminal connected to a first terminal of a first offset control switch. The first offset control switch has a second terminal connected to a third input terminal of the resistive voltage divider that is connected to a junction of two resistors of the multiple serially connected resistors. A second adjustable current source for generating the offset feedback voltage of a second polarity (negative) has a first terminal connected to a first terminal of a second offset control switch. The second offset control switch has a second terminal connected to the second terminal of the first offset control switch and the third input terminal of the resistive voltage divider. A second terminal of the second adjustable current source is connected to the ground reference voltage source. An output of the feedback offset generator is connected to a junction of two resistors of the multiple serially connected resistors and to the non-inverting input of the error amplifier.

In other embodiments, the feedback offset generator is formed as multiple switched offsetting current sources placed within the error amplifier. The multiple offsetting current sources have a control terminal that permits a selected offsetting current source to be activated to modify the threshold value of the error amplifier based on the offset feedback voltage to be generated.

In still other embodiments, the feedback voltage is applied to an inverting terminal of an operational amplifier and the reference voltage source is connected to the non-inverting terminal of the operational amplifier. The output terminal of the operational amplifier is connected to a gate of transistor of a first conductivity type (PMOS). The source of the transistor of a first conductivity type (PMOS is connected to the power supply voltage source. The drain of the transistor of a first conductivity type (PMOS) is connected to a first terminal of a first resistor of a string of multiple serially connected resistors of a resistive divider. A second terminal of a last resistor of the serial string of resistors of the resistive divider is connected to the ground reference voltage source. A third current source has a first terminal connected to the power supply voltage source and a second terminal connected to a first terminal of a third offset control switch. The third offset control switch has a second terminal connected to a third input terminal of the resistive voltage divider that is connected to a junction of two of the resistors of the string of multiple serially connected resistors. A fourth current source has a first terminal connected to a first terminal of a fourth offset control switch. The fourth offset control switch has a second terminal connected to the second terminal of the third offset control switch and the third input terminal of the resistive voltage divider. A second terminal of the fourth current source is connected to the ground reference voltage source. An output terminal of the feedback offset generator is connected to a junction of two resistors of the multiple serially connected resistors and to the non-inverting input of the error amplifier.

Further in other embodiments, the offset generator includes multiple current sources, wherein a first half of the multiple current sources have a first terminal connected to a power supply voltage source. A second terminal of each of the first half of the multiple current sources is connected to a first terminal of one of multiple control switches. A first terminal of each of a second half of the multiple current sources is connected to a first terminal of one of the control switches of the multiple switches. A second terminal of each of the second half of the multiple current sources is connected to the ground reference voltage source.

Multiple resistors are serially connected together. A first terminal of a first resistor of the serially connected multiple resistors is connected to either the reference voltage source or to the feedback voltage. A second terminal of a last resistor of the multiple serially connected resistors is connected to either input of the error amplifier. A second terminal of two of the multiple control switches is connected together and to the common connection of two resistors of the multiple serially connected resistors. Each of the switches has a control terminal that permits a selected current source to be activated to offset the voltage level of the feedback voltage or the reference voltage.

The feed-forward compensation control circuit is placed the between the output of the feed-forward amplifier and multiple feed-forward capacitors. Each of the multiple feed-forward capacitors has a first terminal that is commonly connected together and to the output terminal of the control stage circuit of the switch mode DC/DC power converter. A second terminal of each of the multiple feed-forward capacitors is connected to a first terminal of one switch of multiple switches. A second terminal of each of the multiple switches that is connected to the multiple feed-forward capacitors is connected to the output of the feed-forward amplifier. A maximum feed-forward voltage source has a first terminal connected to a first terminal of a first feed-forward voltage selector switch and a second terminal connected to a ground reference voltage source. A second terminal of the first feed-forward voltage selector switch is connected to the second terminal of one of the multiple feed-forward capacitors. A median feed-forward voltage source has a first terminal connected to a first terminal of a second feed-forward voltage selector switch and a second terminal connected to a ground reference voltage source. A second terminal of the second feed-forward voltage selector switch is connected to the second terminal of one of the multiple feed-forward capacitors. A minimum feed-forward voltage source has a first terminal connected to a first terminal of a third feed-forward voltage selector switch and a second terminal connected to a ground reference voltage source. In various embodiments, the minimum feed-forward voltage source is eliminated and the first terminal of the third feed-forward voltage selector switch is connected to the ground reference voltage source.

Each of the multiple feed-forward capacitors and the first, second, and third feed-forward voltage selector switches have a control terminal connected to receive the output control signals generated by the control loop monitor logic circuit configured for selective activation of each of the multiple feed-forward capacitors and the first, second, and third feed-forward voltage selector switches.

In various embodiments of the present disclosure that accomplish at least one of these objectives, a switch mode DC/DC power converter has a control stage circuit that has a control loop monitor, a feedback voltage offset generator, an error amplifier current offset generator, and a feed-forward compensation circuit as described above.

In various embodiments of the present disclosure that accomplish at least one of these objectives, a method for improving the large signal response of control stage circuit of a switch mode DC/DC power converter by increasing the differential input range of the error amplifier of the control stage circuit by segmenting and adding an offset to the error amplifier input and output. The control stage circuit includes monitoring a control loop of the switch mode DC/DC power converter to determine a difference between a feedback voltage developed from the output voltage of the switch mode DC/DC power converter and a reference voltage. It is determined that a transient has occurred at the input terminal or output terminal of the switch mode DC/DC power converter from the difference of the between a feedback voltage developed from the output voltage and the reference voltage. The feedback voltage developed from the output voltage is offset in multiple segments by multiple offset voltages to prevent saturation of the control stage circuit when a large transient signal is received. Counteracting offset voltages are added to an output of an error amplifier of the control stage circuit configured for maintaining the output voltage of the error amplifier to prevent overshoot or undershoot. A feed-forward compensation signal is generated with the amplitude of the signal being clamped to at least one fixed voltage level between a minimum and a maximum amplitude of the feed-forward compensation signal. The feed-forward compensation signal is added to the output of the error amplifier to produce an output error signal of the control stage circuit configured for controlling the modulating of the input power voltage of the switch mode DC/DC power converter.

BRIEF DESCRIPTION OF THE DRAWINGS

FIG. 1b is a schematic diagram of a control stage circuit of the related art of the switch mode DC/DC power converter of FIG. 1a.

FIG. 1c is a plot of gain and phase vs. frequency of the control stage circuit control stage circuit of the related art of the switch mode DC/DC power converter of FIG. 1a.

FIG. 3 is a schematic diagram of control stage circuit as implemented for a switch mode DC/DC power converter of the present disclosure as shown in FIG. 1a.

FIG. 4a is a plot of the transfer function of the error amplifier of the control stage circuit of the related art of the switch mode DC/DC power converter of FIG. 1a.

FIG. 4b is a plot of the transfer function of the transconductance amplifier of the control stage circuit of the present disclosure of the switch mode DC/DC power converter of FIG. 1a.

FIG. 4c is plot of the transfer function of the transconductance amplifier and error amplifier current offset generator of the control stage circuit of the present disclosure of the switch mode DC/DC power converter of FIG. 1a.

FIG. 4d is plot of the transfer function of the feed-forward amplifier of the control stage circuit of the present disclosure of the switch mode DC/DC power converter of FIG. 1a.

FIG. 4e is plot of the transfer function of the error amplifier of the control stage circuit of the present disclosure of the switch mode DC/DC power converter of FIG. 1a.

FIGS. 5a, 5b, 5c, 5d-1 and 5d-2 are schematic diagrams of embodiments of input offset generators as implemented for the control stage circuit of the present disclosure of the switch mode DC/DC power converter of FIG. 1a.

FIGS. 7a and 7b are plots of the output voltage versus time of the feed-forward amplifier of the control stage circuit of the present disclosure of the switch mode DC/DC power converter of FIG. 1a.

FIG. 8 is a plot of the behaviour of the control stage circuit of the present disclosure of FIG. 3 of the switch mode DC/DC power converter of FIG. 1a.

DETAILED DESCRIPTION

To improve the large signal response, the control stage circuit as implemented for a switch mode DC/DC power converter of the present disclosure increases the differential input range of an error amplifier within the control stage circuit by segmenting and adding an offset to the error amplifier input and output.

Figure 3:
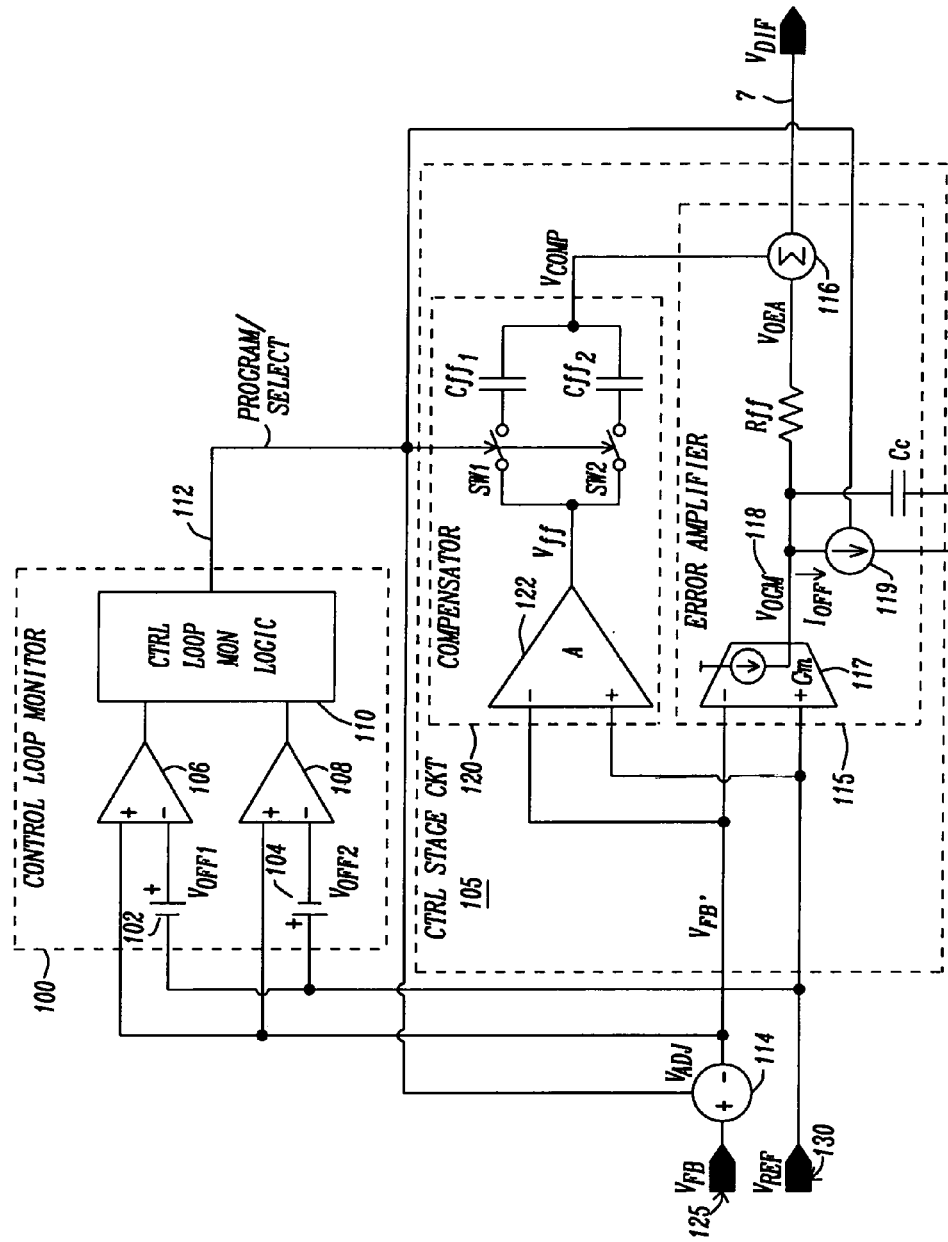

FIG. 3 is a schematic diagram of control stage circuit 105 as implemented for a switch mode DC/DC power converter of the present disclosure showing the segmenting, the adding an offset voltage and current to the error amplifier 115 input and output, and the adding of additional feed-forward-capacitors $Cff_1$ and $Cff_2$ to the feed-forward compensator 120. The control stage circuit 105 is structured similarly to that of the control stage circuit of the related art of FIG. 1b.

The control stage circuit 105 has an error amplifier 115 that includes a differential transconductance amplifier 117. The differential transconductance amplifier 117 receives the offset feedback voltage $V_{FB'}$ at its inverting terminal (−) from the 125 negative terminal of the programmable feedback voltage offset generator 114 and the reference voltage $V_{REF}$ at its non-inverting terminal (+) from the terminal 130. The output of the differential transconductance amplifier 117 is connected to a first terminal of the feed-forward resistor $R_{ff}$ and the first terminal of the compensation capacitor $C_c$. The second terminal of the compensation capacitor $C_c$ is connected to the ground reference voltage. The second terminal of feed forward resistor $R_{ff}$ is connected to the summation node 116. The summation node 116 is a single connection for combining the output signal $V_{OEA}$ of the error amplifier 115 with the output signal $V_{COMP}$ of the feed-forward compensator 120. The summation of the output signal $V_{OEA}$ of the error amplifier 115 and the output signal $V_{COMP}$ of the feed-forward compensator 120 provides the difference output voltage $V_{DIF}$ to terminal 7 for transmission the power stage 10. Since the summation node 116 is simple connection with not physical circuitry, it is not described further hereinafter.

The feed-forward compensator 120 adds feed-forward compensation that increases the phase margin, defined as the difference between the unity-gain phase shift and −180°, which is the point where the loop becomes unstable.

The feed-forward finite gain amplifier 122 receives the offset feedback signal $V_{FB'}$ at its inverting terminal (−) and the reference voltage $V_{REF}$ at its non-inverting terminal (+). The output of the feed-forward finite gain amplifier 122 is connected to the first terminal of the multiple feed-forward capacitors $Cff_1$ and $Cff_2$ through the switches SW1 and SW2. The second terminal of each of the feed-forward capacitors $Cff_1$ and $Cff_2$ is connected to the second terminal of the feed forward resistor $R_{ff}$ and connected to the output terminal 7 of the error amplifier 115 for providing the error amplifier voltage $V_{OEA}$ to the power stage 10.

The terminal 125 is connected to a first terminal (+) of the programmable feedback voltage offset generator 114, such that the programmable feedback voltage offset generator 114 receives the feedback voltage $V_{FB}$. The programmable feedback voltage offset generator 114 provides an adjustment voltage $V_{ADJ}$ that is added to the feedback voltage $V_{FB}$ to create the offset feedback voltage $V_{FB'}$. The second terminal (−) of the programmable feedback voltage offset generator 114 is connected 135 to the input of the control stage circuit 105 to provide the offset feedback voltage $V_{FB'}$ to the inputs of the error amplifier 115 and the feed-forward compensator 120. The terminal 130 is connected to the input of the control stage circuit 105 to provide the reference voltage $V_{REF}$ to the inputs of the error amplifier 115 and the feed-forward compensator 120.

Figure 1A:
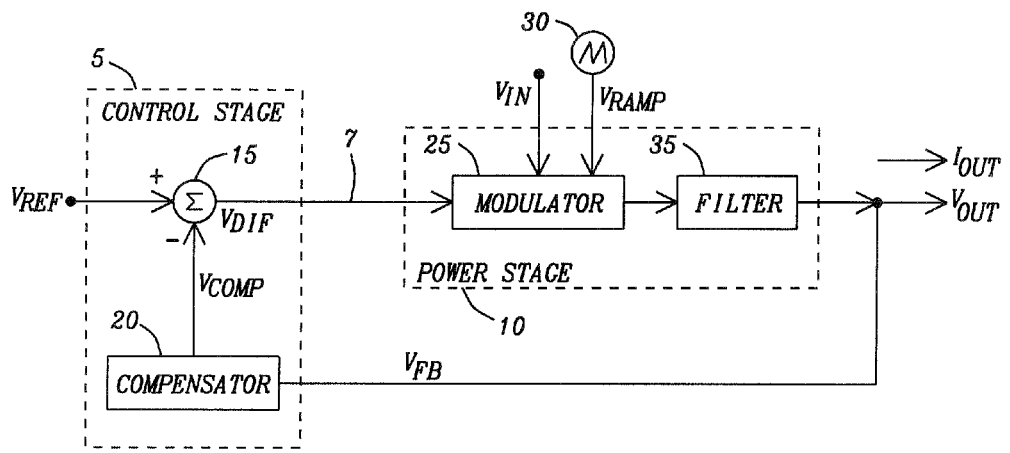
FIG. 1a is a block diagram of a switch mode DC/DC power converter.

The control loop monitor 100 receives the offset feedback signal $V_{FB'}$ and the reference voltage $V_{REF}$. The control loop monitor 100 is configured for determining that a large transient has occurred at the line and/or the load of the switch mode DC/DC power converter. The control loop monitor 100 has a first offset voltage source 102 and a second offset voltage source 104. A negative terminal of the first offset voltage source 102 is connected to receive the reference voltage $V_{REF}$ and the positive terminal of the first offset voltage source 102 is connected to an inverting terminal of a first comparator circuit 106. A positive terminal of the second offset voltage source 104 is connected to receive the reference voltage $V_{REF}$ and the negative terminal of the second offset voltage source 104 is connected to an inverting terminal of a second comparator circuit 108. The first and second offset voltage sources 102 and 104 to set positive voltage boundary $V_{OFF1}$ and negative voltage boundary $V_{OFF2}$ for the feedback signal $V_{FB}$. The offset feedback signal $V_{FB'}$ is applied to the non-inverting terminals of the first and second comparators 106 and 108. When a large line and/or load transient occurs at the input voltage terminal $V_{IN}$ or the output terminal $V_{OUT}$ of the switch mode DC/DC power converter as shown in FIG. 1a, one of the first or second comparators 106 and 108 will be activated and the output terminal of the activated comparator will have a signal level of a first logic state and the output terminal of the deactivated comparator will have a signal level of a second logic level. The output signal levels of the first and second comparators 106 and 108 are decoded by a control loop monitor logic circuit 110 that determines if any line and/or load transient is a large increase or a large decrease.

The output 112 of the control loop monitor logic circuit 110 is a program/select line. The program/select line 112 is at least one connection applied to the programmable feedback voltage offset generator 114 for controlling the offset voltage of the segments applied to the feedback signal voltage $V_{FB}$ for determining the offset feedback voltage $V_{FB'}$. The program/select line 112 is at least one connection applied to the switches SW1 and SW2 for controlling the feed-forward compensation during an occurrence of the large line and/or load transient at the input terminal $V_{IN}$ or the output terminal $V_{OUT}$ of the switch mode DC/DC power converter.

The transconductance amplifier 117 receives the offset feedback signal voltage $V_{FB'}$ requires an equivalent but with opposing polarity offset voltages at the output terminal 118 of the transconductance amplifier 117 to generate a corrected output signal $V_{OGM}$. An error amplifier current offset generator 119 is connected to the transconductance amplifier 117 for generating the output offset current that develops the offset voltage across the feed-forward resistor Rff.

Figure 4A:
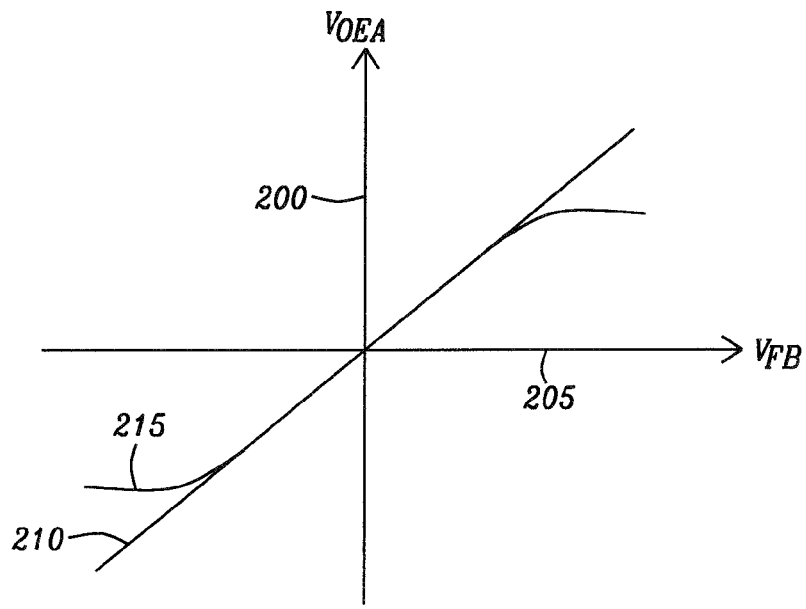
Figure 4B:
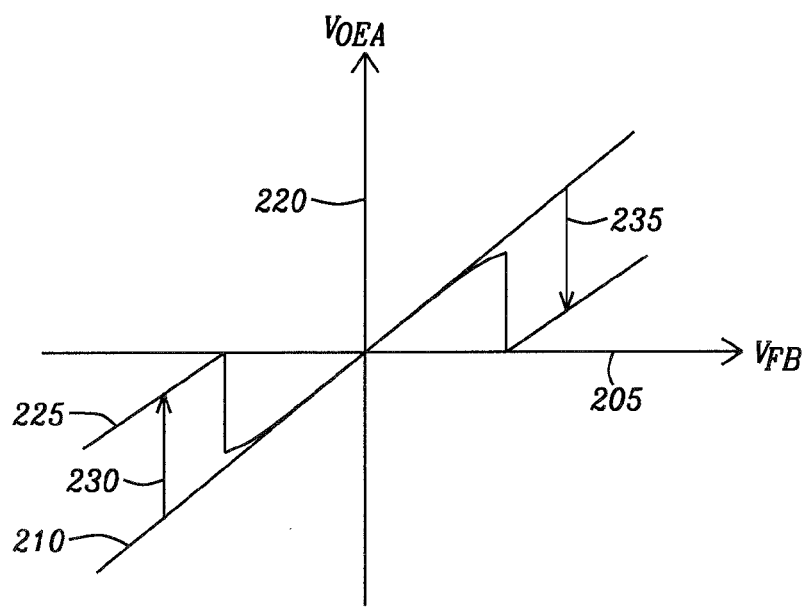
Figure 4C:
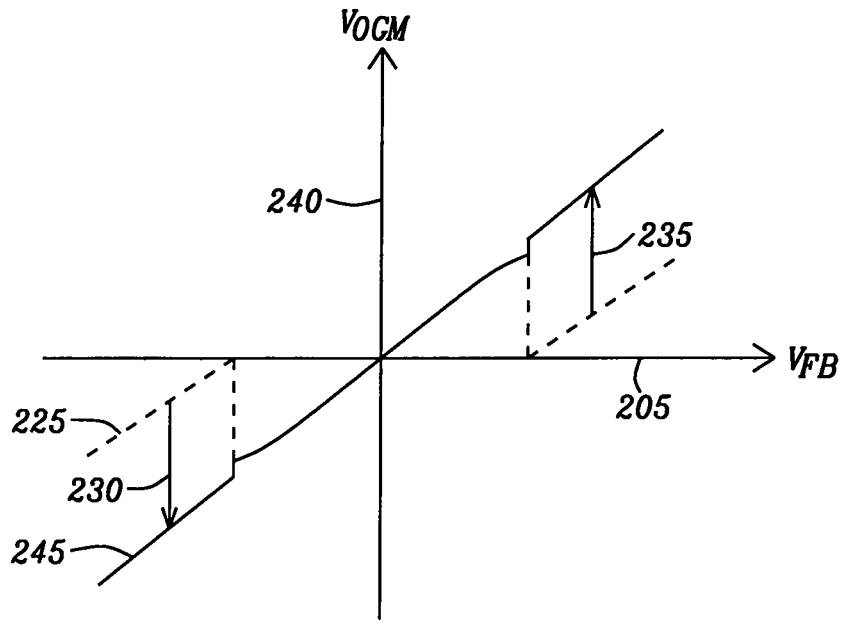
Figure 4D:
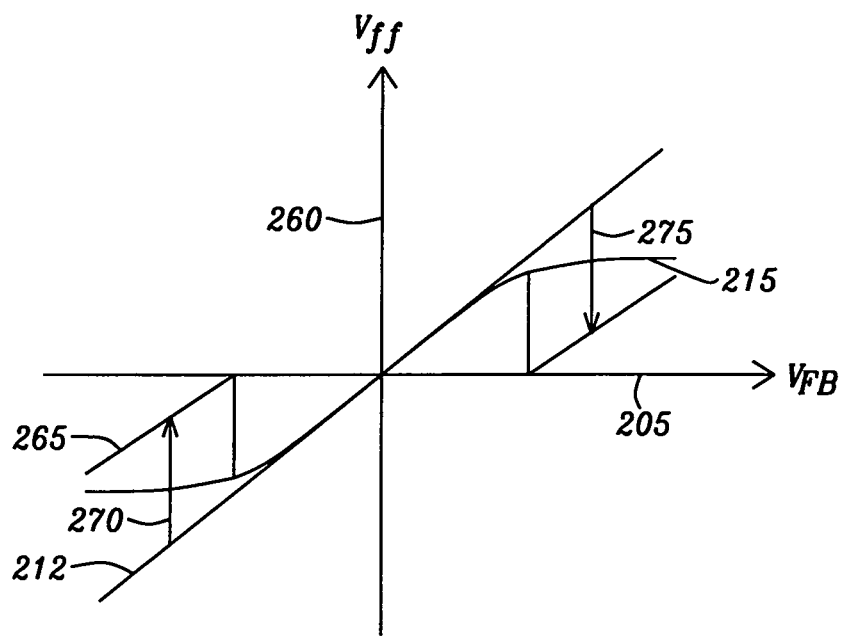
Figure 4E:
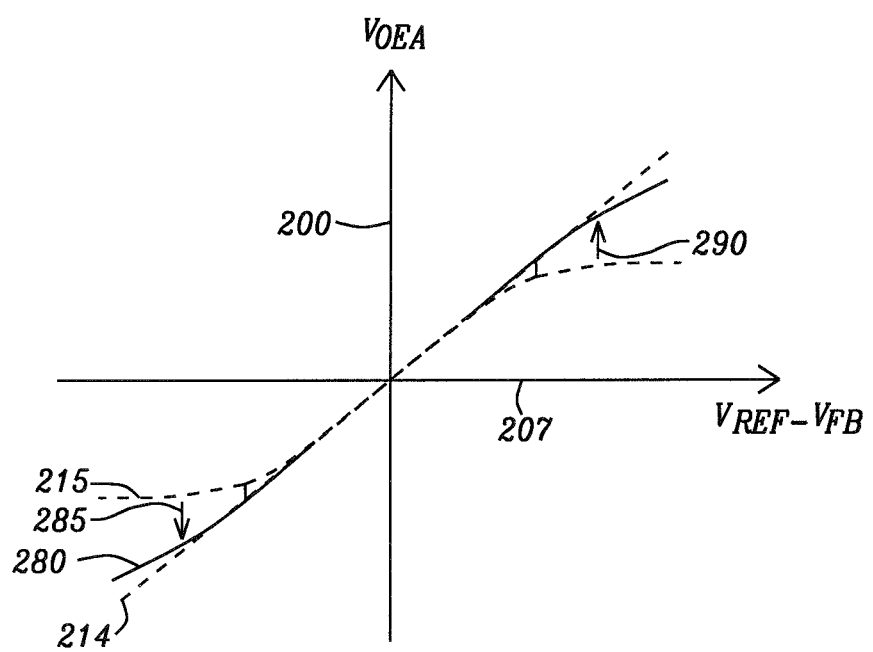

FIG. 4a is a plot of the transfer function of the error amplifier of the control stage circuit of the related art of the switch mode DC/DC power converter of FIG. 1a. FIG. 4b is a plot of the transfer function of the transconductance amplifier of the control stage circuit of the present disclosure of the switch mode DC/DC power converter of FIG. 1a. FIG. 4c is plot of the transfer function of the transconductance amplifier and offset current source of the control stage circuit of the present disclosure of the switch mode DC/DC power converter of FIG. 1a. FIG. 4d is plot of the transfer function of the feed-forward amplifier 122 of the control stage circuit of the present disclosure of the switch mode DC/DC power converter of FIG. 1a. FIG. 4e is plot of the transfer function of the error amplifier of the control stage circuit control stage circuit of the present disclosure of the switch mode DC/DC power converter of FIG. 1a.

Figure 1B:
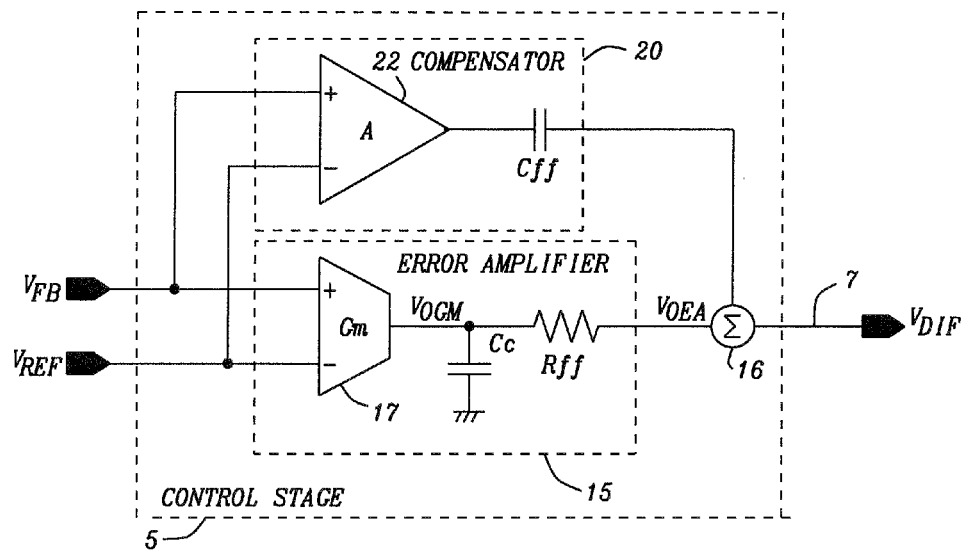
Figure 1C:
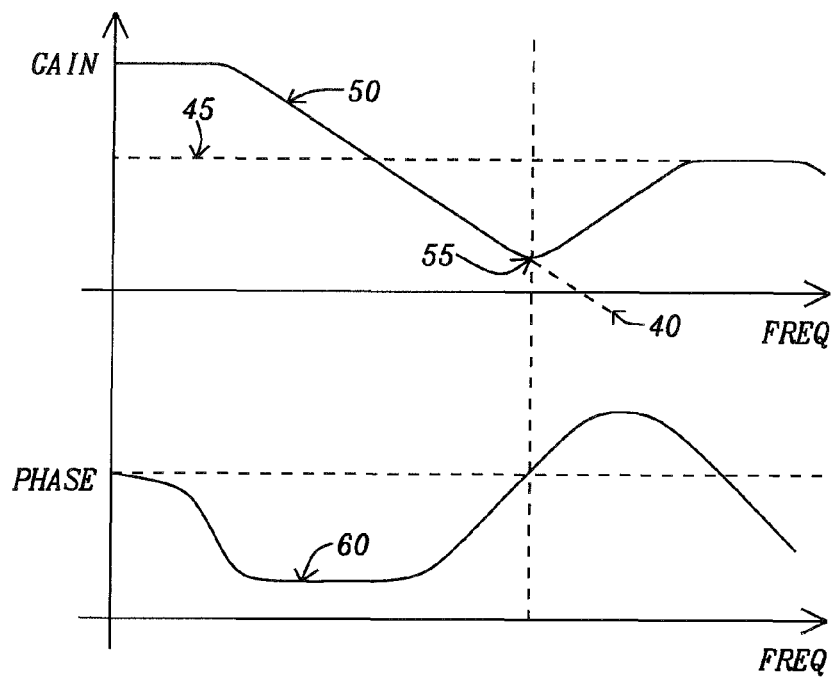

In FIG. 4a, the horizontal axis 205 is the amplitude of the feedback signal $V_{FB}$ and the vertical axis 200 is the amplitude of the output signal $V_{OEA}$ of the error amplifier 15 of the related art as shown in FIG. 1b. The line 210 represents an idealized transfer characteristic of the feedback signal $V_{FB}$ versus the output signal $V_{OEA}$. The line 215 represents the actual transfer characteristic of the feedback signal $V_{FB}$ versus the output signal $V_{OEA}$ for FIGS. 4a-4e. As the amplitude of the feedback signal $V_{FB}$ becomes very large, the output signal $V_{OEA}$ begins flatten as the amplifier begins to saturate.

Referring to FIGS. 3 and 4b, the horizontal axis 205 is the amplitude of the feedback signal $V_{FB}$ and the vertical axis 220 is the amplitude of the output signal $V_{OEA}$ of the error amplifier 115. The line 210 represents an idealized transfer characteristic of the feedback signal $V_{FB}$ versus the transconductance amplifier output signal $V_{oGm}$. The magnitude of the feedback signal $V_{FB}$ is now segmented as shown with line 225, once the magnitude of the feedback signal $V_{FB}$ has reach a relatively large level and the output signal $V_{OGM}$ is approaching the saturation level. The segmentation of the feedback signal $V_{FB}$ is accomplished by adding voltage offsets 230 and 235 to the feedback signal $V_{FB}$.

Referring to FIGS. 3 and 4c, the horizontal axis 205 is the amplitude of the feedback voltage $V_{FB}$ and the vertical axis 240 is the amplitude of the output signal $V_{OGM}$ of the transconductance amplifier 117 plus the error amplifier current offset generator 119. The line 212 represents an idealized transfer characteristic of the feedback voltage $V_{FB}$ versus the output signal $V_{OGM}$ of the transconductance amplifier 117. The transconductance amplifier 117 receives the offset feedback voltage $V_{FB'}$ as shown in line 225 and therefore requires equivalent but with opposing polarity offset voltages 270 and 275 at the output voltage terminal of the transconductance amplifier 117 to generate a corrected output signal signal $V_{OGM}$.

Referring to FIGS. 3 and 4d, the impact of the offset voltage level in the feed-forward path is not important to the feed-forward compensator 120, so the counter offset voltage is not applied to the feed-forward output signal $V_{ff}$. The selection of the feed-forward-capacitors and the addition of the feed-forward voltage sources are described hereinafter.

Referring to FIG. 3 and FIG. 4e, the horizontal axis 207 is the amplitude of the differential voltage between the feedback voltage $V_{FB}$ and the reference voltage $V_{REF}$. The vertical axis 220 is the amplitude of the output signal $V_{OEA}$ of the error amplifier 115. The input range, as shown, is the difference between the actual transfer characteristic of the feedback signal $V_{FB}$ versus the output signal $V_{OEA}$ and the increased transfer characteristic 285 and 290 of the feed-forward compensator 120. The input range of the feed-forward compensator 120 can be increased by increasing the number of segments of the offset voltages applied to the feedback voltage $V_{FB}$.

Figure 5A:
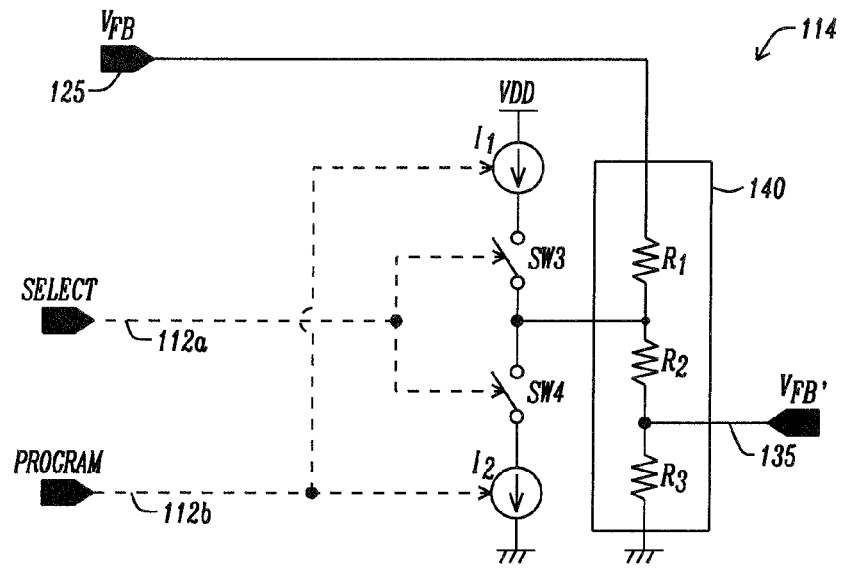

FIGS. 5a, 5b, 5c, 5d-1 and 5d-2 are schematic diagrams of embodiments of input offset generators as implemented for the control stage circuit of the present disclosure. Referring to FIG. 5a, the feedback signal $V_{FB}$ is connected to a first terminal of a voltage divider 140. A second terminal of the voltage divider 140 is connected to the ground reference voltage source. The voltage divider is formed of multiple series connected resistors. In the implementation of FIG. 5a, there are three series connected resistors $R_1$, $R_2$, and $R_3$. A third terminal 135 is formed at a junction of the second resistor $R_2$ and the third resistor $R_3$ to provide the offset feedback signal $V_{FB'}$ to the control stage circuit 105.

A first adjustable current source $I_1$ has a first terminal connected to a power supply voltage source VDD and a second terminal connected to a first terminal of a third switch SW3. A second terminal of the third switch SW3 is connected to the fourth terminal of the voltage divider 140 that is connected to a junction of the first resistor $R_1$ and the second resistor $R_2$. A second adjustable current source $I_2$ has a first terminal connected to a first terminal of a fourth switch SW4 and a second terminal of the fourth switch SW4 is connected to the junction of the second terminal of the third switch SW3 and the fourth terminal of the voltage divider 140. The second terminal of the second adjustable current source $I_2$ is connected to the ground reference voltage.

The control terminals of the first adjustable current source $I_1$ and second adjustable current source $I_2$ are connected to the program line 112b. The program line 112b is at least one connection applied to the first adjustable current source $I_1$ and second adjustable current source $I_2$ for programming the current levels and thus the offset voltage of the offset feedback voltage $V_{FB''}$. The control terminals of the switches SW3 and SW4 are connected to the select line 112a. The select line 112a is at least one connection applied to the switches SW3 and SW4 for activating the first adjustable current source $I_1$ and second adjustable current source $I_2$ and thus set the polarity of the offset feedback voltage $V_{FB''}$.

Figure 5B:
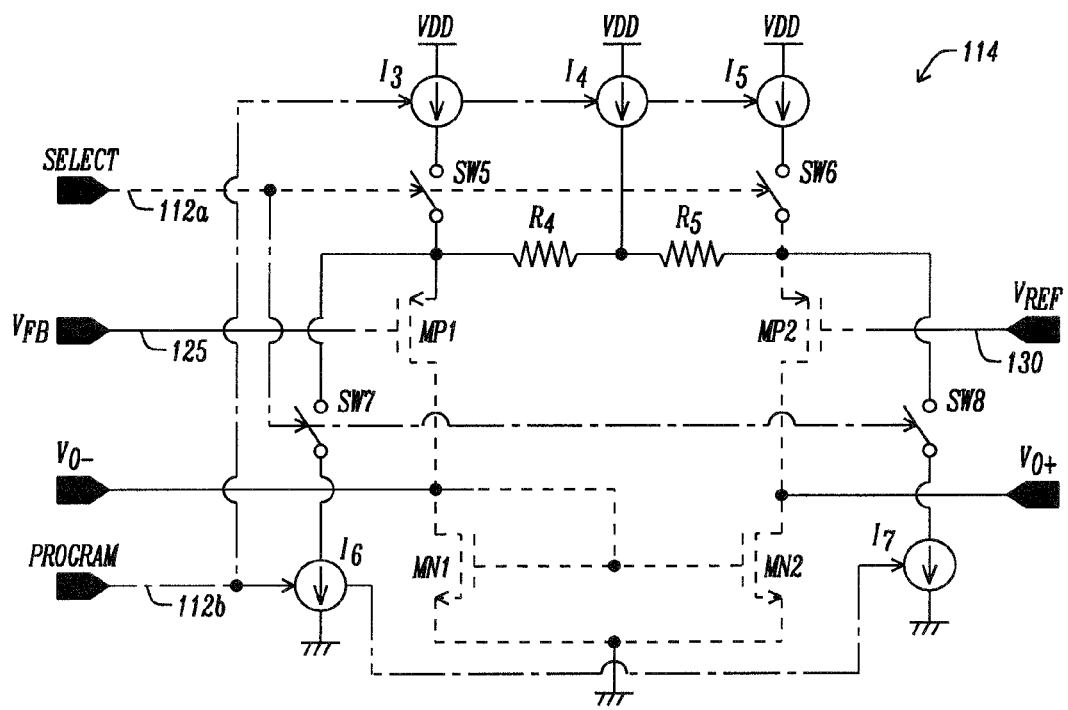

Referring to FIG. 5b, the offset feedback voltage $V_{FB'}$ is generated within the transconductance amplifier 117. The differential pair of PMOS transistors MP1 and MP2 forms the transconductance amplifier. The feedback signal $V_{FB}$ is applied to the gate of the PMOS transistor MP1 and the reference voltage $V_{REF}$ is applied to the gate of the PMOS transistor MP2. The load current mirror is formed of the NMOS transistors MN1 and MN2. The NMOS transistor MN1 has is drain and gate connected together and connected to the drain of the PMOS transistor MP1 to form the inverting output $V_{O-}$. The diode connected transistor MN1 forms the reference leg of the load current mirror and the NMOS transistor MN2 forms the mirror leg of the load current mirror. The gate of the NMOS transistor MN2 is connected to the drain and gate of the NMOS transistor MN1. The sources of the NMOS transistors MN1 and MN2 are connected to the ground reference voltage source. The drain of the NMOS transistor MN2 is connected to the drain of the PMOS transistor MP2 to form the non-inverting output $V_{O+}$.

In a traditional transconductance amplifier, the sources of the PMOS transistors MP1 and MP2 are connected together and to a single current source $I_4$. To provide the necessary offset voltage to the feedback signal $V_{FB}$, the source of the PMOS transistors MP1 is connected to a first terminal of the resistor $R_4$ and the source of the PMOS transistors MP2 is connected to a first terminal of the resistor $R_5$. The second terminals of the resistors $R_4$ and $R_5$ are connected together. The effective offset voltage is selectively generated by the adjustable current sources $I_3$, $I_5$, $I_6$, and $I_7$. The common connection of the source of the PMOS transistors MP1 and the first terminal of the resistor $R_4$ is connected to the first terminal of a switch SW5. The second terminal of a switch SW5 is connected to a first terminal of the current source $I_3$ and the second terminal of the current source $I_3$ is connected to the power supply voltage source VDD. The common connection of the source of the PMOS transistors MP1 and the first terminal of the resistor $R_4$ is also connected to the first terminal of a switch SW7. The second terminal of a switch SW7 is connected to a first terminal of the current source $I_6$ and the second terminal of the current source $I_6$ is connected to the ground reference voltage source. The commonly connected second terminals of the resistors $R_4$ and $R_5$ are connected to a first terminal of the current source $I_4$. The second terminal of the current source $I_4$ is connected to the power supply voltage source VDD. The common connection of the source of the PMOS transistors MP2 and the first terminal of the resistor $R_5$ is connected to the first terminal of a switch SW6. The second terminal of a switch SW6 is connected to a first terminal of the current source $I_5$ and the second terminal of the current source $I_5$ is connected to the power supply voltage source VDD. The common connection of the source of the PMOS transistors MP2 and the first terminal of the resistor $R_5$ is also connected to the first terminal of a switch SW8. The second terminal of a switch SW8 is connected to a first terminal of the current source $I_7$ and the second terminal of the current source $I_7$ is connected to the ground reference voltage source.

The control terminals of the switches SW5, SW6, SW7, and SW8 are connected to the select line 112a. The select line 112a is at least one connection applied to the switches SW5, SW6, SW7, and SW8 for selectively activating the adjustable current sources $I_3$, $I_5$, $I_6$, and $I_7$ and thus set the polarity of the offset of the reference voltage $V_{FB}$. When SW5 and SW8 are activated, a negative offset voltage $(R_4+R_5)\times I_3$ where $I_3=I_7$ is given to the feedback signal $V_{FB}$. When SW6 and SW7 are activated, a positive offset voltage $(R_4+R_5)\times I_5$ where $I_5=I_6$ is given to the feedback signal $V_{FB}$. The control terminals of the adjustable current sources $I_3$, $I_5$, $I_6$, and $I_7$ are connected to the program line 112b. The program line 112b is at least one connection applied to the adjustable current sources $I_3$, $I_5$, $I_6$, and $I_7$ for programming the current levels and thus the offset voltage level applied to the feedback voltage $V_{FB}$.

Figure 5C:
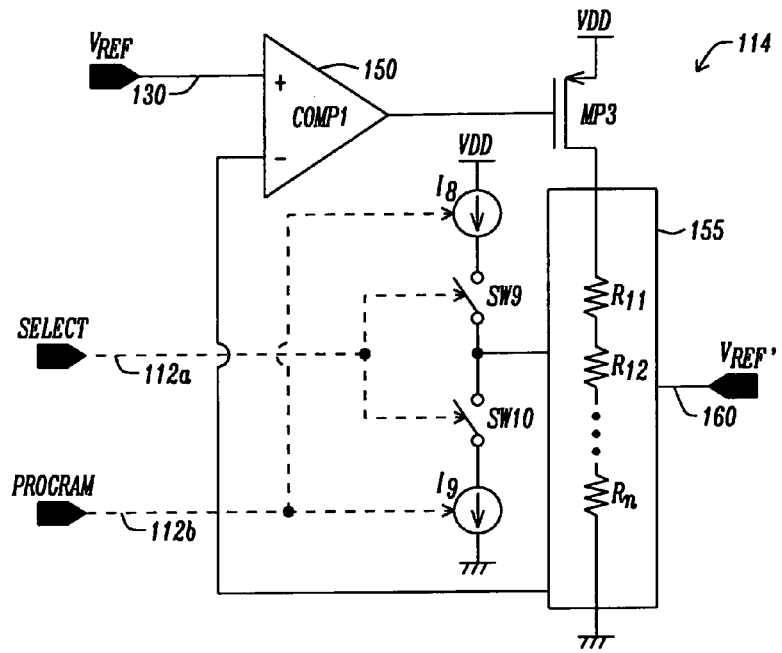

Referring to FIG. 5c, the offset generator utilizes a resistive divider 155 from a digital-to-analog converter employed in the circuitry for generating the reference voltage $V_{REF}$. The voltage divider is formed of multiple series connected resistors $R_{11}$, $R_{12}$, . . . , $R_n$. A first terminal of the voltage divider 155 connects a first terminal of the first resistor $R_{11}$ of the voltage divider 155 to a drain of a PMOS transistor MP3. A second terminal of the voltage divider 155 connects a first terminal of the last resistor $R_n$ of the voltage divider 155 to the ground reference voltage level. A third terminal 160 is formed at a junction of two of the serially connected resistors $R_{11}$, $R_{12}$, . . . , $R_n$ of the voltage divider 155 to provide the offset reference voltage $V_{REF'}$ to the control stage circuit 105.

The terminal 130 applies the reference voltage $V_{REF}$ to an inverting input of an operational amplifier 150. The non-inverting input of the operational amplifier 150 is connected to one junction of two of the resistors of the resistive divider 155 to provide feedback from the resistive divider 155 to the operational amplifier 150. The output of the operational amplifier 150 is connected to the gate of the PMOS transistor MP3. The output signal of the operational amplifier 150 provides a biasing voltage for the PMOS transistor MP3 to control the current through the resistive divider 155.

A first terminal of an adjustable current source $I_8$ is connected to the power supply voltage source VDD and a second terminal of the adjustable current source $I_8$ is connected to a first terminal of the switch SW9. A second terminal of the switch SW9 is connected to a first terminal of the switch SW10. The second terminal of the switch SW10 is connected to a first terminal of the adjustable current source $I_9$ and the second terminal of the adjustable current source $I_9$ is connected to the ground reference voltage source. The common junction of the second terminal of the switch SW9 and the first terminal of the switch SW10 is connected to a junction of one pair of resistors of the resistive divider 155 for selectively providing a current to the resistive divider 155 for creating the necessary offset to the reference voltage $V_{REF}$. The control terminals of the current source $I_8$ and current source $I_9$ are connected to the program line 112b. The program line 112b is at least one connection applied to the adjustable current source $I_8$ and adjustable current source $I_9$ for programming the current levels and thus the offset voltage of the offset reference voltage $V_{REF''}$. The control terminals of the switches SW9 and SW10 are connected to the select line 112a. The select line 112a is at least one connection applied to the switches SW9 and SW10 for activating the adjustable current source $I_8$ and adjustable current source $I_9$ and thus set the polarity of the offset reference voltage $V_{REF''}$.

Figures 1, 5D:
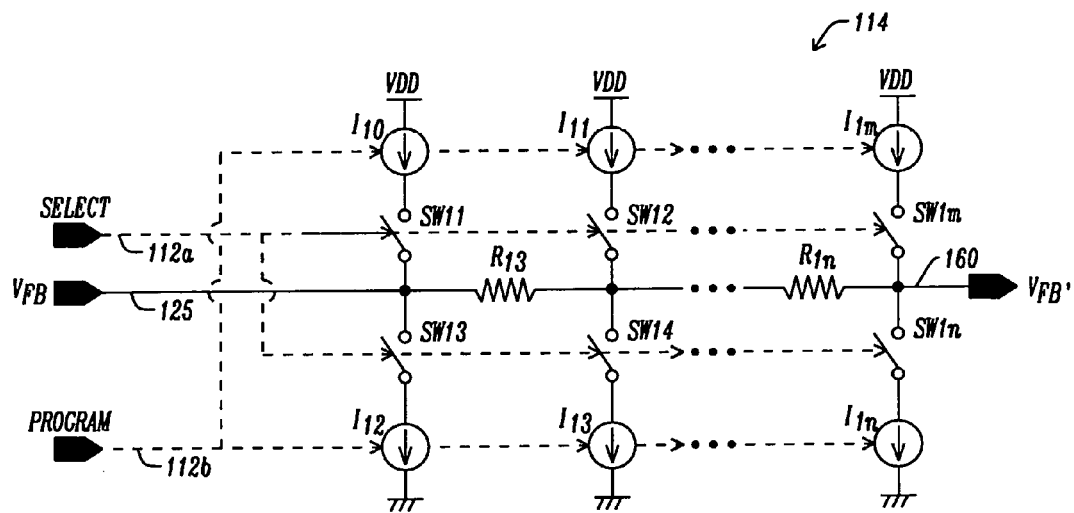
Figures 2, 5D:
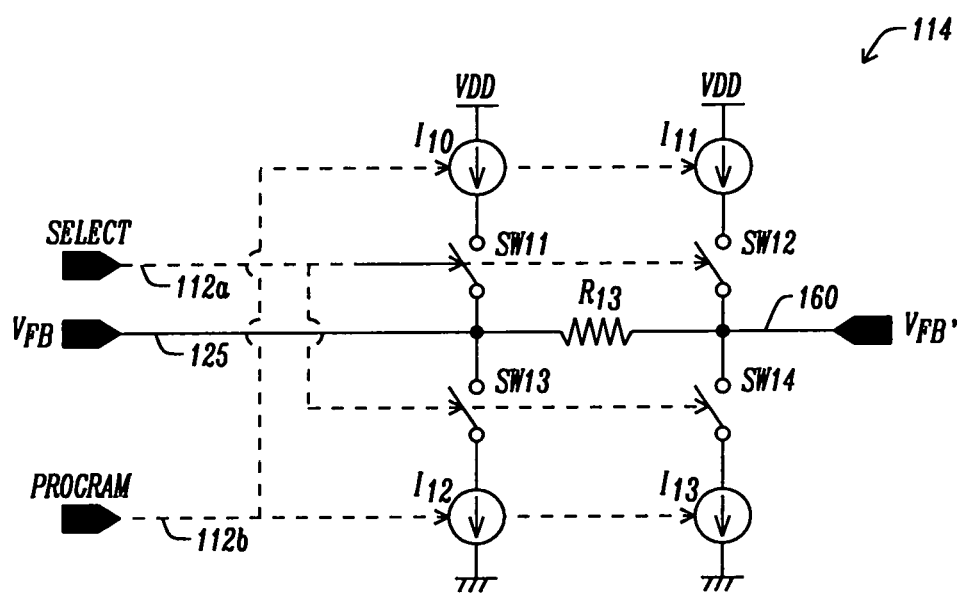

Referring to FIG. 5d-1 for a generalization of an offset generator providing multiple offsets to the offset feedback signal $V_{FB'}$ to generate multiple segments to the output $V_{OEA}$, of the control stage circuit 105. Multiple resistors $R_{13}, \ldots, R_{1n}$ are connected serially together. The first terminal of the first resistor $R_{13}$ is connected to the terminal 130 for receiving the feedback signal $V_{FB}$. The second terminal of the resistor $R_{1n}$ is connected to the terminal 160 to provide the offset feedback signal $V_{FB}$ to the control stage circuit 105. The first terminals of the adjustable current sources $I_{10}, I_{11}, \ldots$, and $I_{1m}$ are connected to the power supply voltage source VDD. The second terminals of the adjustable current sources $I_{10}, I_{11}, \ldots$, and $I_{1m}$ are connected to the first terminals of the switches SW11, SW12, ..., SW1m and the second terminals of the switches SW11, SW12, ..., SW1m are connected to the first terminals of the switches SW13, SW14, ..., SW1n. The second terminals of the switches SW13, SW14, ..., SW1n are connected to the first terminals of the adjustable current sources $I_{12}$, $I_{13}, \ldots$, and $I_{1n}$ and the second terminals of the adjustable current sources $I_{12}, I_{13}, \ldots$, and $I_{1n}$ are connected to the ground reference voltage source.

The junction of the second terminal of the switch SW11 and first terminal of the switch SW13 is connected to the first terminal of the resistor $R_{13}$. Similarly, the junctions of the second terminal of the switches SW12, ..., and first terminals of the switches SW14, ..., are connected to the junctions of the multiple resistors $R_{13}, \ldots, R_{1n}$. Finally, the junction of the second terminal of the switch SW1m and first terminal of the switch SW1n is connected to the second terminal of the resistor $R_{1n}$ and the output terminal 160 for providing the offset feedback voltage $V_{FB''}$. The control terminals of the switches SW11, SW12, ..., SW1m and switches SW13, SW14, ..., SW1n are connected to the select line 112a. The select line 112a is at least one connection applied to the switches SW11, SW12, ..., SW1m and switches SW13, SW14, ..., SW1n for activating the adjustable current sources $I_{10}, I_{11}, \ldots$, and $I_{1m}$ and adjustable current sources $I_{12}, I_{13}, \ldots$, and $I_{1n}$ to thus set the polarity of the offset feedback signal $V_{FB''}$. The control terminals of the adjustable current sources $I_{10}, I_{11}, \ldots$, and $I_{1m}$ and adjustable current sources $I_{12}, I_{13}, \ldots$, and $I_{1n}$ are connected to the program line 112b to thus set the amplitude of the offset voltage for the offset feedback signal $V_{FB''}$.

It should be noted that the terminal 130 applies the feedback signal $V_{FB}$ to the first terminal of the first resistor $R_{13}$. However, if the reference voltage $V_{REF}$ is applied to the first terminal of the first resistor $R_{13}$, the output voltage is the offset reference voltage $V_{REF'}$ and generates the segments for increasing the differential input range of the control stage circuit 105.

Figure 2:
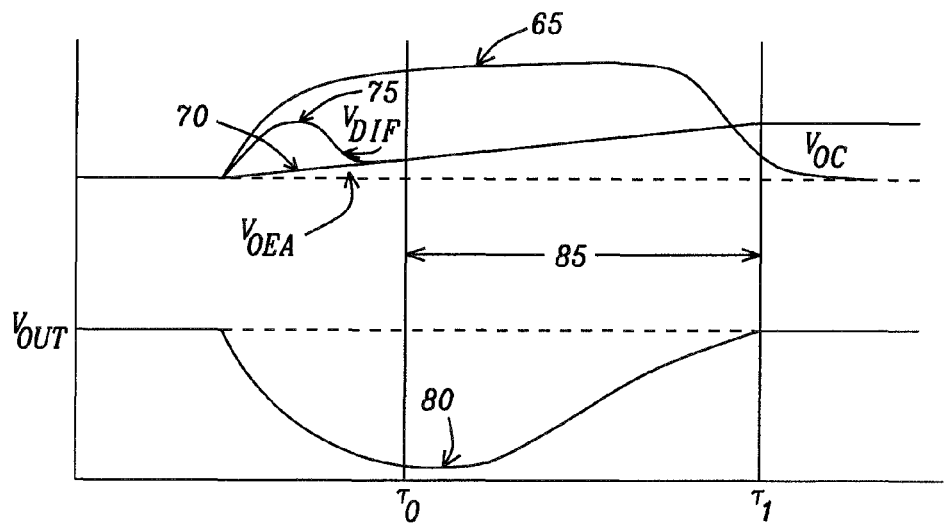
FIG. 2 is a plot of the large signal response of the error amplifier and output voltage of the switch mode DC/DC power converter FIG. 1a employing the control stage circuit of the related art.

Referring to FIG. 5d-2, the offset generator 114 is a simplified version of the offset generator 114 of FIG. 5d-1. In this case there is one single resistor $R_{13}$ with its first terminal connected to the terminal 130 to receive the feedback signal $V_{FB}$. The second terminal of the resistor $R_{13}$ is connected to the terminal 160 to transfer the offset feedback signal $V_{FB'}$ to the control stage circuit 105. The first terminals of the adjustable current sources $I_{10}$, and $I_{11}$ are connected to the power supply voltage source VDD. The second terminals of the adjustable current sources $I_{10}$ and $I_{11}$ are respectively connected to the first terminals of the switches SW11 and SW12 and the second terminals of the switches SW11 and SW12 are respectively connected to the first terminals of the switches SW13 and SW14. The second terminals of the switches SW13 and SW14 are respectively connected to the first terminals of the adjustable current sources $I_{12}$ and $I_{13}$ and the second terminals of the adjustable current sources $I_{12}$ and $I_{13}$ are connected to the ground reference voltage source.

The junction of the second terminal of the switch SW11 and first terminal of the switch SW13 is connected to the first terminal of the resistor $R_{13}$. Similarly, the junctions of the second terminal of the switches SW12 and first terminal of the switch SW14 are connected to the second terminal of the resistor $R_{13}$ and the output terminal 160 for providing the offset feedback voltage $V_{FB''}$.

The select line 112a is at least one connection applied to the switches SW11 and SW12 and switches SW13 and SW14 for activating the adjustable current sources $I_{10}$ and $I_{11}$ and adjustable current sources $I_{12}$ and $I_{13}$ to thus set the polarity of the offset feedback signal $V_{FB''}$. The control terminals of the adjustable current sources $I_{10}$ and $I_{11}$ and adjustable current sources $I_{12}$ and $I_{13}$ are connected to the program line 112b to thus set the amplitude of the offset voltage for the offset feedback signal $V_{FB''}$.

Figure 6A:
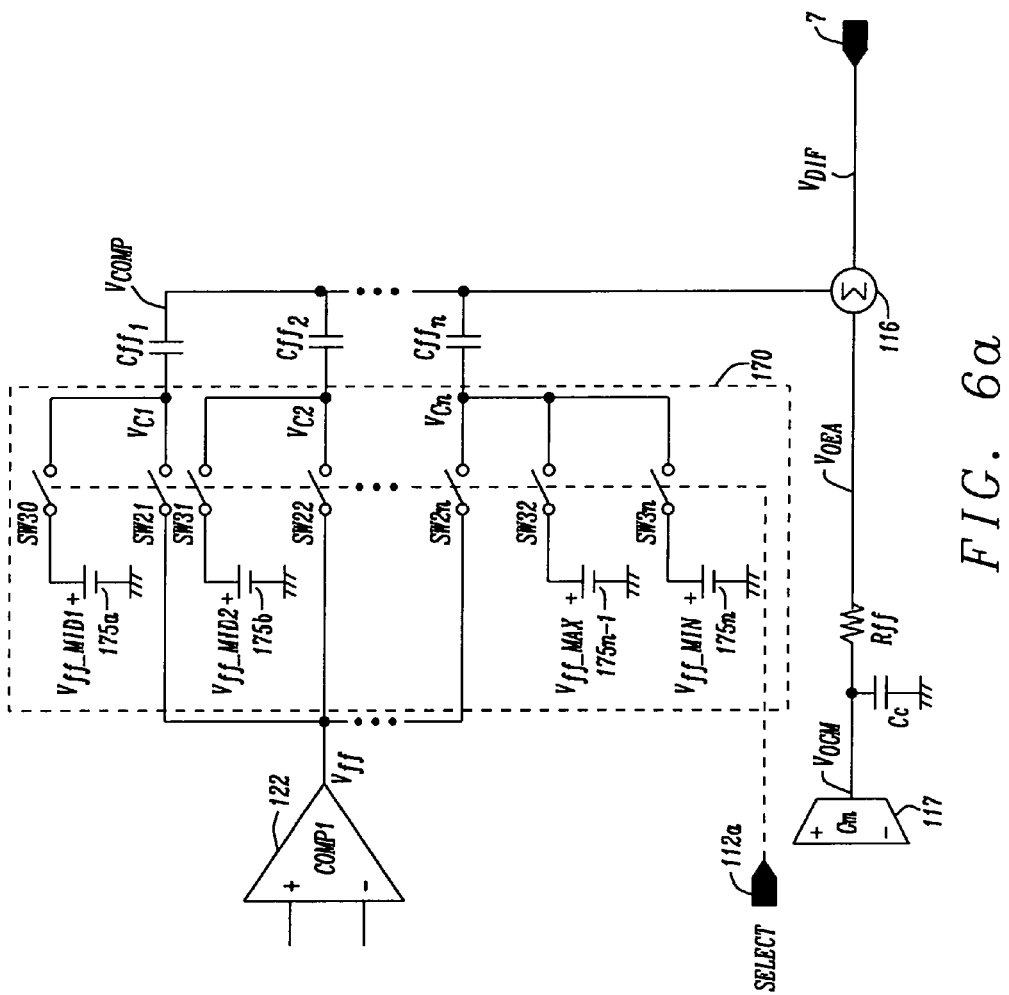
FIGS. 6a and 6b are schematic diagrams of embodiments of the feed-forward capacitor control circuit as implemented for the control stage circuit as implemented for a switch mode DC/DC power converter of the present disclosure.
Figure 6B:
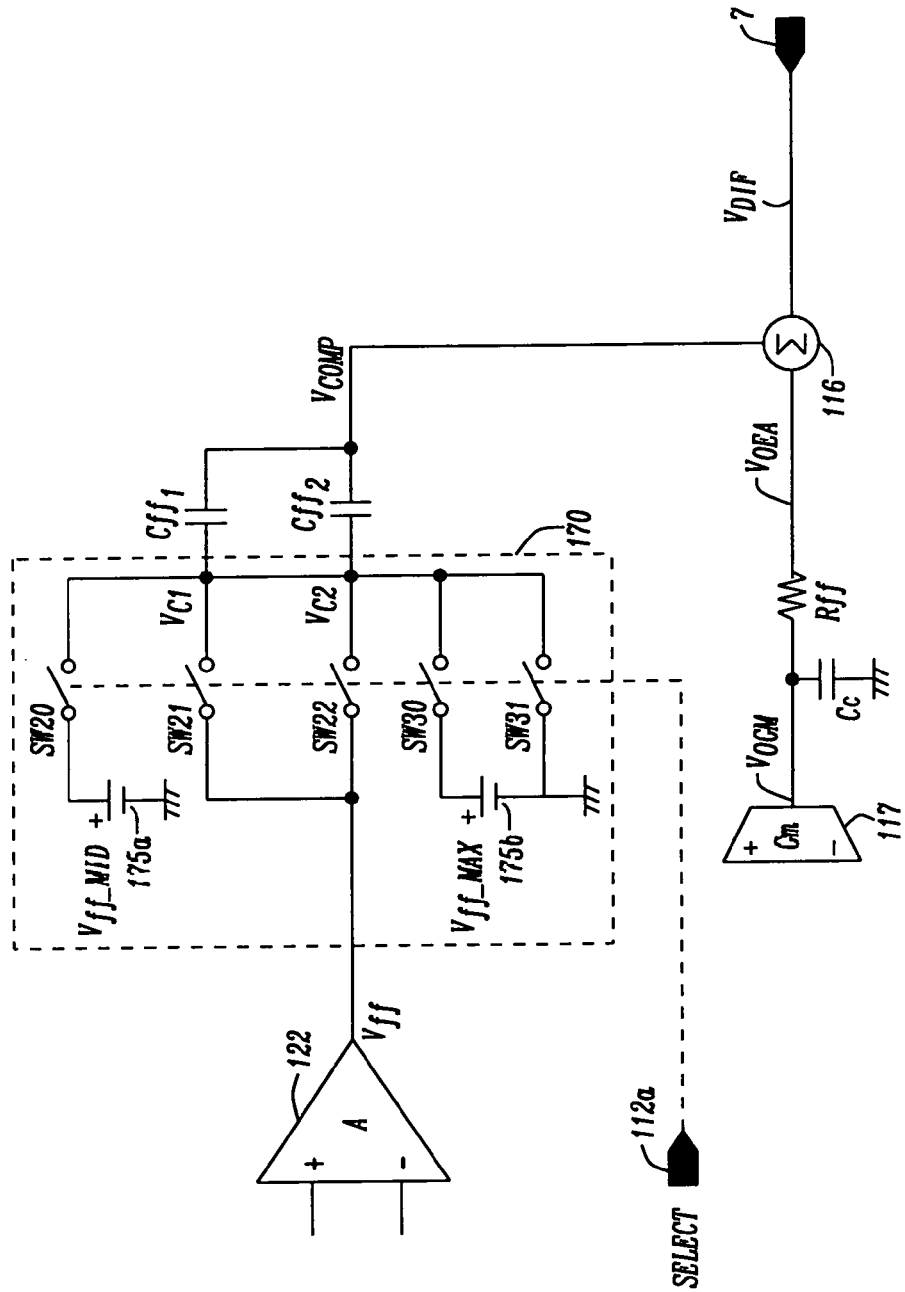

FIGS. 6a and 6b are schematic diagrams of embodiments of the feed-forward capacitor control circuit of the control stage circuit as implemented for a switch mode DC/DC power converter of the present disclosure. Referring to FIG. 6a for a generalization of the feed-forward capacitor control circuit of the control stage circuit of the present disclosure. The output of the feed-forward amplifier 122 of the feed-forward compensator 120 is connected to the first terminals of the switches SW21, SW22, ..., SW2n and the second terminals of the switches SW21, SW22, ..., SW2n are connected to the first terminals of the capacitors $Cff_1$, $Cff_2, \ldots, Cff_n$. The first terminals (+) of the voltage sources 175a, 175b, ..., 175n-1, 175n are connected to the first terminals of the switches SW31, SW32, ..., SW3n. The second terminals (−) of the voltage sources 175a, 175b, ..., 175n-1, 175n are connected to the ground reference voltage source. The second terminals of the switches SW31, SW32, ..., SW3n are connected to the first terminals of the capacitors $Cff_1, Cff_2, \ldots, Cff_n$. The second terminals of the capacitors $Cff_1, Cff_2, \ldots, Cff_n$ are commonly connected together and to the output of the error amplifier 115 that is connected to the terminal 7 that provides the control stage circuit difference output voltage $V_{DIF}$ to the input of the power stage 10 of FIG. 1a. The select line 112a is connected to the control terminal of the switches SW21, SW22, SW2n and the switches SW31, SW32, ..., SW3n for selecting which of the capacitors $Cff_1, Cff_2, \ldots, Cff_n$ are connected to the feed-forward operational amplifier 122 and which of the voltage sources 175a, 175b, ..., 175n-1, 175n are connected to the capacitors $Cff_1$, $Cff_2, \ldots, Cff_n$. The number of capacitors $Cff_1, Cff_2, \ldots, Cff_n$ is determined by the number of desired segments for increasing the input range of the control stage circuit 105 of FIG. 3.

Referring to FIG. 6b for an implementation of the feed-forward capacitor control circuit 170 of the control stage circuit 105 of the present disclosure. The number of capacitors $Cff_1, Cff_2, \ldots, Cff_n$ being one less than the desired number of stages. In this instance, the requirement is for three segments in the transfer curve and therefore two feed-foreword capacitors $Cff_1$ and $Cff_2$. The minimum voltage is determined to be zero volts or the level of the ground reference voltage source. Therefore, the voltage source 175*n* is set to zero volts or eliminated and the first terminal of the switch SW31 is connected to the ground reference voltage source. The mid-level feed-forward voltage source $V_{ff\_MID}$ has its first terminal connected to the first terminal of the switch SW20. The second terminal of the switch SW20 is connected to the first terminal of the feed-forward capacitor CFF₁. The output of the feed-forward amplifier 122 is connected to the first terminal of the switch SW21. The second terminal of the switch SW21 is connected to the first terminal of the feed-forward capacitor CFF₁. The first terminal of the switch SW22 is connected to the output of the feed-forward amplifier 122. The first terminal of the voltage source 180 is connected to the first terminal of the switch SW30. The second terminal of the voltage source 180 is connected to the ground reference voltage source. The second terminals of the switches as SW22, SW30, and SW31 are connected to the first terminal of the capacitor CFF₂. The second terminals of the capacitor CFF₁ and CFF₂ are commonly connected and connected to the output 7 of the control stage circuit 105 for transfer of the difference output voltage $V_{DIF}$ to the power stage 10 of FIG. 1*a*.

The select line 112*a* is connected to the control terminals of the switches SW21, SW22, SW30, and SW31 for selecting which of the capacitors Cff₁ and Cff₂, are connected to the feed-forward amplifier 122 and which of the voltage sources 175*a* and 175*b* are connected to the capacitors Cff₁ and Cff₂. The two capacitors Cff₁ and Cff₂ indicate that there are two segments for increasing the input range of the control stage circuit 105 of FIG. 3.

Figure 7A:
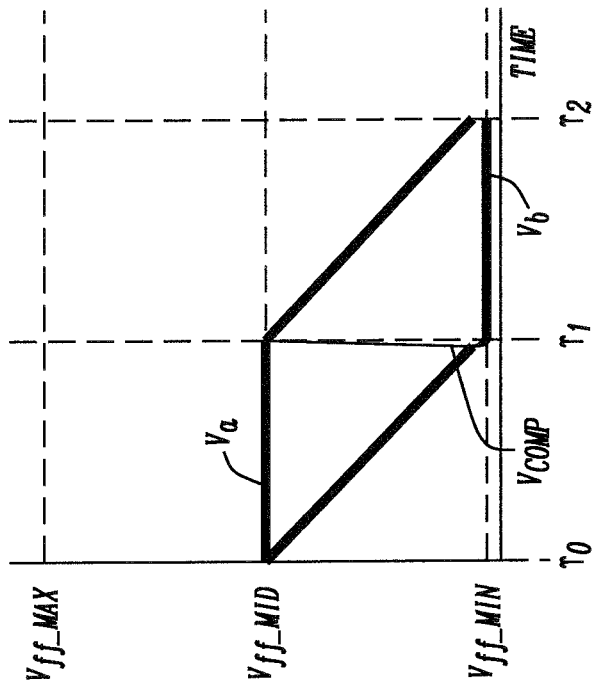
Figure 7B:
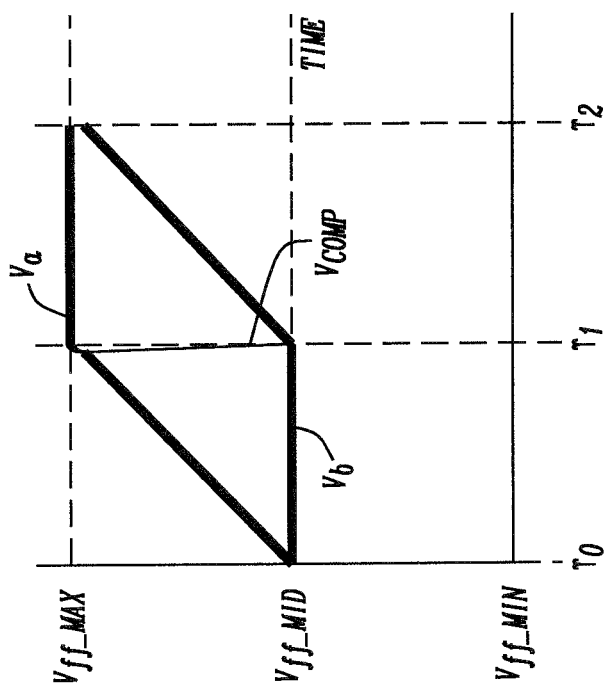

FIGS. 7*a* and 7*b* are plots of the output voltage versus time of the feed-forward compensator 120 of the control stage circuit 105 of the switch mode DC/DC power converter of the present disclosure. Prior to the occurrence of the large positive transient voltage at the time $\tau_0$, the differential input of the error amplifier 115 is small and the feed-forward capacitor Cff₂ is connected to the output of the feed-forward amplifier 122 through the switch SW22. The switch SW20 is activated to connect the mid-level voltage source 175*a* with first terminal of the feed-forward capacitor Cff₁. The voltage level $V_{C1}$ is thus set to the voltage level $V_{FF\_MID}$ of the mid-level voltage source 175*a*. The voltage level $V_{FF\_MID}$ of the mid-level voltage source 175*a* is equal to the amplitude of the output of the feed-forward amplifier 122 when the difference in amplitude between the feedback voltage $V_{FB}$ and the reference voltage $V_{REF}$ is zero (0).

In FIG. 7*a*, the control loop monitor 100 detects that a large positive transient has occurred at the output of the switch mode DC/DC power converter at the time $\tau_1$. The switch SW22 is deactivated and the switch SW30 is activated to connect the first terminal of the maximum level voltage source 175*b* to the first terminal of the feed-forward capacitor Cff₂. The voltage level $V_{ff\_MAX}$ of the maximum level voltage source 175*b* is the maximum amplitude of the output of the feed-forward amplifier 122. The switch SW20 is deactivated and the switch SW21 is activated to connect the output of the feed-forward amplifier 122 to the first terminal of the feed-forward capacitor Cff₁. The voltage level $V_{COMP}$ of the feed-forward compensator 120 starts to rise toward the maximum voltage of the output of the feed-forward amplifier 122, when the control loop monitor 100 detects that a large positive transient at the time $\tau_1$. The voltage level $V_{COMP}$ then falls to the level of the voltage level $V_{C1}$ at the first terminal of the feed-forward capacitor Cff₁. The voltage level $V_{COMP}$ then rises to the voltage level $V_{C2}$ at the first terminal of the feed-forward capacitor Cff₂ that is set to the voltage level $V_{ff\_MAX}$ of the maximum level voltage source 175*b*.

In FIG. 7*b*, the control loop monitor 100 detects that a large negative transient has occurred at the output of the switch mode DC/DC power converter at the time $\tau_1$. The switch SW22 is deactivated and the switch SW31 is activated to connect the ground reference voltage source to the first terminal of the feed-forward capacitor Cff₂. The ground reference voltage source is the minimum amplitude of the output of the feed-forward amplifier 122. The switch SW20 is deactivated and the switch SW21 is activated to connect the output of the feed-forward amplifier 122 to the first terminal of the feed-forward capacitor Cff₁. The voltage level $V_{COMP}$ of the feed-forward compensator 120 starts to fall toward the ground reference voltage source, when the control loop monitor 100 detects that the large negative transient at the time $\tau_1$. The voltage level $V_{COMP}$ then rises to the level of the voltage level $V_{C1}$ at the first terminal of the feed-forward capacitor Cff₁. The voltage level $V_{COMP}$ then falls to the voltage level $V_{C2}$ at the first terminal of the feed-forward capacitor Cff₂ that is set to the voltage level $V_{ff\_MIN}$ or the voltage level of the ground reference voltage source. The segmentation minimizes the disturbances caused by transients to the error amplifier output by transients to the feedback voltage $V_{FB}$ is minimized with the segment transitions.

Figure 8:
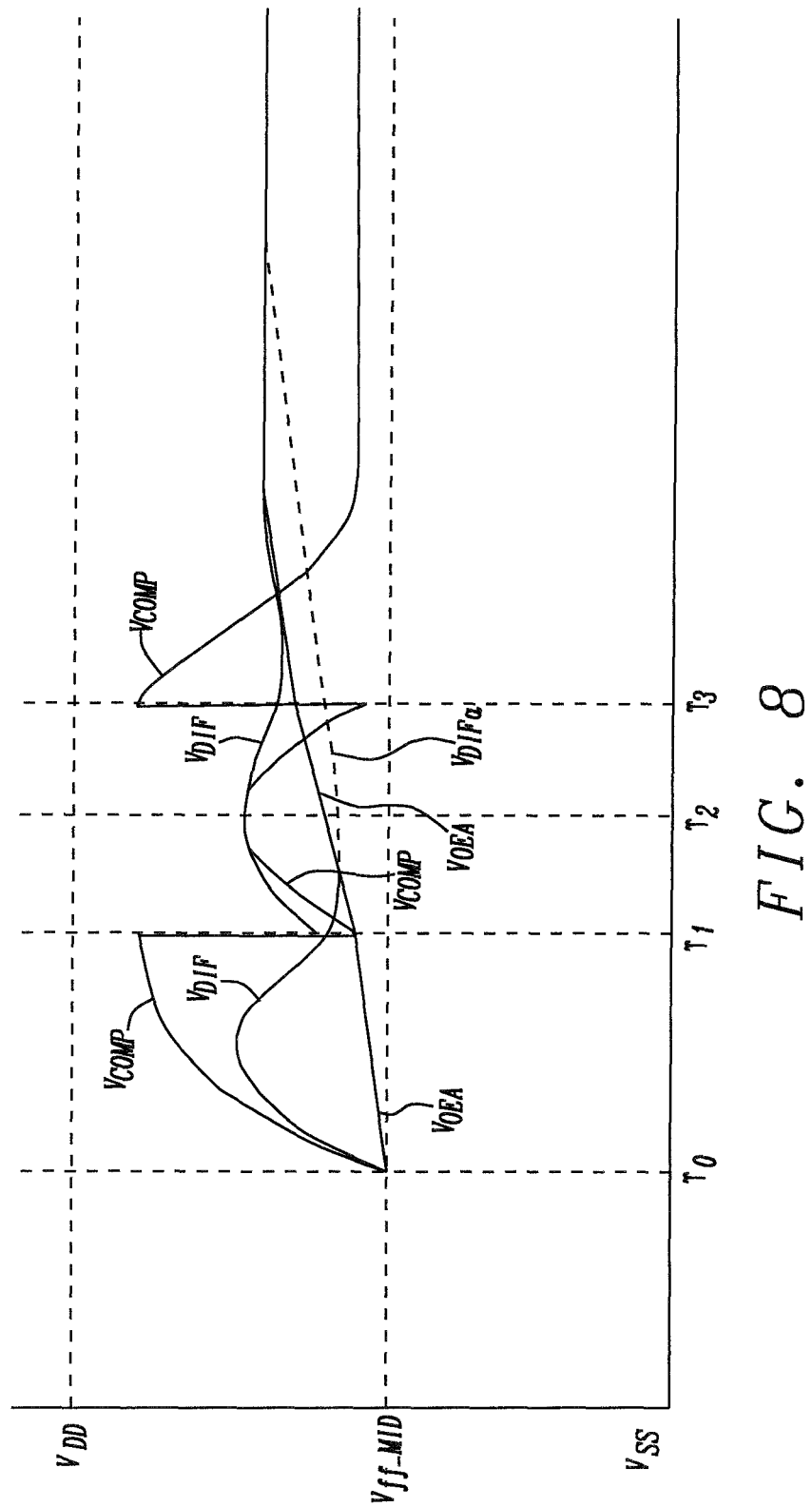

FIG. 8 is a plot of the behaviour of the control stage circuit of the present disclosure of FIG. 3. Prior to the time $\tau_0$, the output of the feed-forward amplifier 122 and the output of the transconductance amplifier 117 are set to the voltage level $V_{FF\_MID}$. At the time $\tau_0$, the feedback voltage $V_{FB}$ begins to decrease from being essentially equal to the value of the reference voltage $V_{REF}$. The output signal $V_{COMP}$ from the output of the feed-forward compensator circuit 120 begins to rise relatively rapidly. The corrected output signal $V_{OEA}$ from the output of the error amplifier 115 begins to rise much more slowly. The two signals are combined at the output of the control stage circuit 105 to generate the difference output circuit $V_{DIF}$. At the time $\tau_1$, the feedback voltage $V_{FB}$ exceeds the negative voltage boundary $V_{OFF2}$. The control loop monitor 100 activates the select line 112*a* to initiate the programmable feedback voltage offset generator 114 and connect the output voltage of the feed-forward amplifier 122 to the first terminal of the feed-forward capacitor Cff₁ where the voltage is mid-level $V_{FF\_MID}$, thus setting the output signal $V_{COMP}$ to the voltage level $V_{FF\_MID}$. The output voltage of the feed-forward compensator circuit 120 begins to rise until the time $\tau_2$. At the time $\tau_2$, the feedback voltage $V_{FB}$ stops decreasing and starts increasing and the output voltage of the feed-forward compensator 120 begins to fall until the time $\tau_3$. At the time $\tau_3$, the feedback voltage $V_{FB}$ exceeds the positive voltage boundary $V_{OFF1}$. The control loop monitor 100 deactivates the select line 112*a* to remove the offset voltage and connect the output voltage of the feed-forward amplifier 122 to the first terminal of the feed-forward capacitor Cff₂ where the voltage is maximum level $V_{FF\_MAX}$, thus setting the output signal $V_{COMP}$ to the voltage level $V_{FF\_MAX}$. The output voltage $V_{COMP}$ of the feed-forward compensator 120 fall to approximately the voltage level $V_{FF\_MID}$ when the feedback $V_{FB}$ the value of the reference voltage $V_{REF}$. The output voltage $V_{DIF}$ of the control stage circuit 105 is the additive combination of the output voltage $V_{COMP}$ of the feed-forward compensator 120 and the output voltage $V_{OEA}$ of the error amplifier 115. Without the second segment of the voltage compensation, the output of the control stage circuit 105 would have had a lower voltage level $V_{DIF}$. This minimizes the disturbance to the output of the error amplifier 115 by segment transitions.

Figure 9:
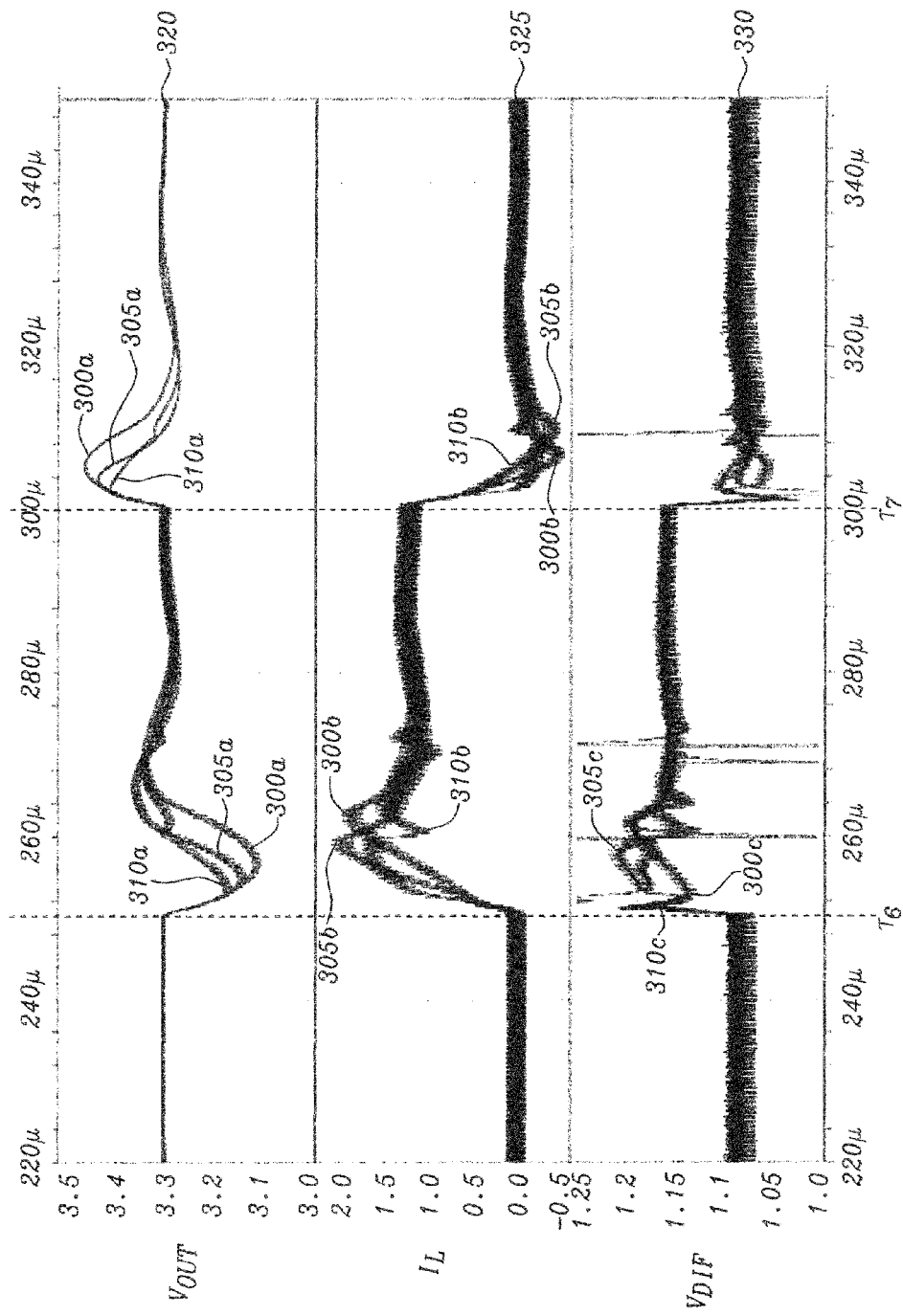
FIG. 9 is a plot of the load transient (1 mA to 0.8 A) with and without the control stage circuit of the present disclosure of FIG. 3.

FIG. 9 is a set of plots of the effects of a load transient (1 mA to 0.8 A) to the switch mode DC/DC power converter of FIG. 1a with and without the control stage circuit of the present disclosure of FIG. 3. The first set of plots 320 illustrates the output voltage $V_{OUT}$ of the switch mode DC/DC power converter FIG. 1a. The prior art plot 300a employs the control stage circuit of FIG. 1b and has the largest disturbance of the output voltage $V_{OUT}$. The plot 305a is of the switch mode DC/DC power converter the control stage circuit of the related patent application included herein by reference. The amplitude of the transient disturbance of the output voltage $V_{OUT}$ is less than the transient disturbance of the output voltage $V_{OUT}$ of the prior art shown in the plot 300a. The plot 310a is of the switch mode DC/DC power converter that employs the control stage circuit of the present disclosure of FIG. 3. The amplitude of the transient disturbance of the output voltage $V_{OUT}$ is less than the transient disturbance of the output voltage $V_{OUT}$ of the prior art shown in the plot 300a and the output voltage $V_{OUT}$ of the related patent application.

The second set of plots 325 illustrates the inductor current $I_L$ of the switch mode DC/DC power converter FIG. 1a. The prior art plot 300b employs the control stage circuit of FIG. 1b and has the largest disturbance of the inductor current $I_L$. The plot 305b is of the switch mode DC/DC power converter the control stage circuit of the related patent application included herein by reference. The amplitude of the transient disturbance of the inductor current $I_L$ is less than the transient disturbance of the inductor current $I_L$ of the prior art shown in the plot 300b. The plot 310b is of the switch mode DC/DC power converter that employs the control stage circuit of the present disclosure of FIG. 3. The amplitude of the transient disturbance of the inductor current $I_L$ is less than the transient disturbance of the inductor current $I_L$ of the prior art shown in the plot 300b and the inductor current $I_L$ of the related patent application shown in the plot 305b.

The third set of plots 330 illustrates the output voltage $V_{DIF}$ of the control stage circuit 105 of FIG. 3 of the switch mode DC/DC power converter FIG. 1a. The prior art plot 300c employs the control stage circuit of FIG. 1b and has the largest disturbance of the output voltage $V_{DIF}$. The plot 305c is of the switch mode DC/DC power converter the control stage circuit of the related patent application included herein by reference. The amplitude of the transient disturbance of the output voltage $V_{DIF}$ is less than the transient disturbance of the output voltage $V_{DIF}$ of the prior art shown in the plot 300b. The plot 310c is of the switch mode DC/DC power converter that employs the control stage circuit 105 of the present disclosure of FIG. 3. The amplitude of the transient disturbance of the output voltage $V_{DIF}$ is less than the transient disturbance of the output voltage $V_{DIF}$ of the prior art shown in the plot 300c and the output voltage $V_{DIF}$ of the related patent application shown in the plot 305c.

The control stage circuit 105 of FIG. 3 improves the large signal response of control stage circuit 105 of a switch mode DC/DC power converter by increasing the differential input range of the error amplifier 115 of the control stage circuit 105 by segmenting and adding an offset to the error amplifier 115 input and output by adjusting the offset voltage source 114. The control stage circuit 105 includes the control loop monitor 100 for monitoring of the switch mode DC/DC power converter to determine a difference between a feedback voltage $V_{FB}$ developed from the output voltage $V_{OUT}$ of the switch mode DC/DC power converter and a reference voltage $V_{REF}$. From the difference of the difference between a feedback voltage $V_{FB}$ and the reference voltage $V_{REF}$, determining that a transient has occurred at the input terminal or output terminal of the switch mode DC/DC power converter. The feedback voltage $V_{FB}$ is offset in multiple segments by multiple offset voltages to prevent saturation of the control stage circuit 105 when a large transient signal is received. Counteracting offset voltages are added by the error amplifier current offset generator 119 to an output of an error amplifier 115 of the control stage circuit 105 for maintaining the output voltage $V_{OEA}$ of the error amplifier 115 to prevent overshoot or undershoot. A feed-forward compensation signal $V_{COMP}$ is generated with the amplitude of the signal being clamped to at least one fixed voltage level between a minimum and a maximum amplitude of the feed-forward compensation signal $V_{COMP}$. The feed-forward compensation signal $V_{COMP}$ is added to the output $V_{OEA}$ of the error amplifier 115 to produce an output error signal $V_{DIF}$ of the control stage circuit 105 for controlling the modulating of the input power voltage of the switch mode DC/DC power converter.

Figure 10:
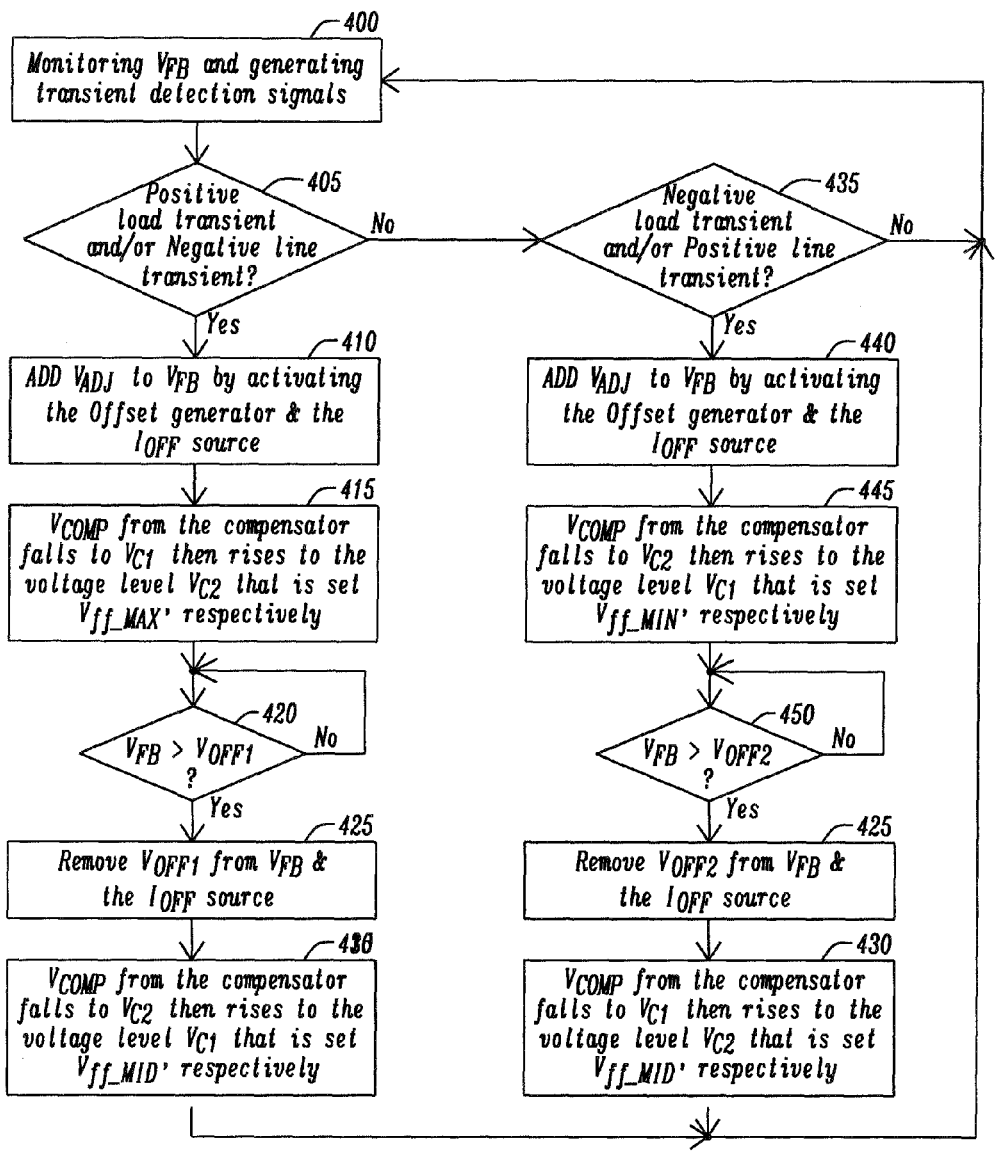
FIG. 10 is a flowchart of a method for operating a switch mode DC/DC power converter of the present disclosure.

FIG. 10 is a flowchart of a method for operating a switch mode DC/DC power converter of the present disclosure for improving the large signal response of the error amplifier 115 within a control stage 105 of the switch mode DC/DC power converter. Referring to FIGS. 3 and 10, the control loop monitor 100 monitors (Box 400) a feedback signal $V_{FB}$ and generates transient detection signals. The transient detection signals are examined (Box 405) to determine if a positive load transient and/or a negative line transient has occurred.

If the control loop monitor 100 detects that a positive load transient and/or a negative line transient has occurred, a positive offset voltage $V_{ADJ}$ is added (Box 410) to the feedback signal $V_{FB}$ by activating the offset voltage generator 114 and the offset current $I_{OFF}$ from the current source 119. The voltage level $V_{COMP}$ then falls (Box 415) to the level of the voltage level $V_{C1}$ at the first terminal of the feed-forward capacitor $Cff_1$. The voltage level $V_{COMP}$ then rises to the voltage level $V_{C2}$ at the first terminal of the feed-forward capacitor $Cff_2$ that is set to the voltage level $V_{ff\_MAX}$ of the maximum level voltage source 175b.

The control loop monitor 100 compares (Box 420) the feedback signal $V_{FB}$ with the first offset voltage $V_{OFF1}$ from the first offset voltage source 102. If the feedback signal $V_{FB}$ is not greater than the first offset voltage $V_{OFF1}$, the comparison (Box 420) continues until the feedback signal $V_{FB}$ is greater than the first offset voltage $V_{OFF1}$. When the feedback signal $V_{FB}$ is greater than the first offset voltage $V_{OFF1}$, the positive offset voltage $V_{ADJ}$ is removed from the feedback signal $V_{FB}$ by deactivating the offset voltage generator 114 and the offset current $I_{OFF}$ removed by deactivating the current source 119. The voltage level $V_{COMP}$ then raises from the level of the voltage level $V_{C1}$ at the first terminal of the feed-forward capacitor $Cff_1$. The voltage level $V_{COMP}$ then falls to the voltage level $V_{C2}$ at the first terminal of the feed-forward capacitor $Cff_2$ that is set to the voltage level $V_{ff\_MID}$ of the middle level voltage source 175a.

The control loop monitor 100 monitors (Box 400) the feedback signal $V_{FB}$ and to detect transient signals. If the control loop monitor 100 does not detect that a positive load transient and/or a negative line transient has occurred, the transient detection signals are examined (Box 435) to determine if a negative load transient and/or a positive line transient has occurred. If the control loop monitor 100 detects that a negative load transient and/or a positive line transient has occurred, a negative offset voltage $V_{ADJ}$ is added (Box 440) to the feedback signal $V_{FB}$ by activating the offset voltage generator 114 and the offset current $I_{OFF}$ from the current source 119. The voltage level $V_{COMP}$ then raises (Box 445) to the level of the voltage level $V_{C2}$ at the first terminal of the feed-forward capacitor $Cff_2$. The voltage level $V_{COMP}$ then falls to the voltage level $V_{C1}$ at the first terminal of the feed-forward capacitor $Cff_1$ that is set to the voltage level $V_{ff\_MIN}$, of the minimum level voltage source 175a.

The control loop monitor 100 compares (Box 450) the feedback signal $V_{FB}$ with the second offset voltage $V_{OFF2}$ from the second offset voltage source 104. If the feedback signal $V_{FB}$ is not greater than the first offset voltage $V_{OFF1}$, the comparison (Box 420) continues until the feedback signal $V_{FB}$ is greater than the second offset voltage $V_{OFF2}$. When the feedback signal $V_{FB}$ is greater than the second offset voltage $V_{OFF2}$, the negative offset voltage $V_{ADJ}$ is removed from the feedback signal $V_{FB}$ by deactivating the offset voltage generator 114 and the offset current $I_{OFF}$ removed by deactivating the current source 119. The voltage level $V_{COMP}$ then falls from the level of the voltage level $V_{C2}$ at the first terminal of the feed-forward capacitor $Cff_1$. The voltage level $V_{COMP}$ then raises to the voltage level $V_{C2}$ at the first terminal of the feed-forward capacitor $Cff_2$ that is set to the voltage level $V_{ff\_MID}$, of the middle level voltage source 175a. The control loop monitor 100 then resumes monitoring (Box 400) the feedback signal $V_{FB}$ and to detect transient signals.

While this disclosure has been particularly shown and described with reference to the preferred embodiments thereof, it will be understood by those skilled in the art that various changes in form and details may be made without departing from the spirit and scope of the disclosure.

What is claimed is:

1. A control stage circuit within a switch mode DC/DC power converter comprising:
   a programmable feedback voltage offset generator configured for providing an offset voltage to the feedback voltage to generate an offset feedback voltage when the control loop monitor determines that the offset voltage is required to be provided to the feedback voltage for decreasing overshoot or undershoot of the output voltage of the switch mode DC/DC power converter;
   an error amplifier current offset generator configured for generating offset current to be added to the output of the error amplifier;
   a feed-forward compensation circuit configured for increasing the input range the feed-forward amplifier output and the error amplifier output; and
   a control loop monitor connected to the programmable feedback voltage offset generator, the error amplifier current offset generator, and the feed-forward compensation circuit and configured for monitoring a difference between a feedback voltage developed from the output voltage of the switch mode DC/DC power converter and a positively offset reference voltage and a negatively offset reference voltage for determining if any line and/or load transient signal is an increase or a decrease in magnitude that will cause the overshoot or undershoot of the output voltage of the switch mode DC/DC power converter; and configured for generating output control signals for activating the programmable feedback voltage offset generator, the error amplifier current offset generator, and the feed-forward compensation circuit.

2. The control stage circuit of claim 1 wherein the control loop comprises:
   a first offset reference source comprising:
      a negative terminal connected for receiving a first reference signal;
   a second offset reference source comprising:
      a positive terminal connected for receiving the first reference signal;
   a first comparator comprising:
      a non-inverting input terminal connected for receiving the feedback voltage,
      an inverting input terminal connected to a positive terminal of the first offset reference source,
      a first comparing circuit configured for determining when the feedback signal is greater than a magnitude of a additive combination of the feedback voltage and the magnitude of the first reference source for generating a first transient detection signal of a first logic state;
   a second comparator comprising:
      a non-inverting input terminal connected for receiving the feedback voltage,
      an inverting input terminal connected to a negative terminal of the second offset reference source,
      a second comparing circuit configured for determining when the feedback signal is greater than a magnitude of a subtractive combination of the feedback voltage and the magnitude of the second reference source for generating a second transient detection signal of a first logic state; and
   a transient control circuit in communication with the first and second comparing circuits configured for receiving the first and second transient detection signals, configured for determining if any line and/or load transient signal is an increase or a decrease in magnitude that will cause the overshoot or undershoot of the output voltage of the switch mode DC/DC power converter, and configured for generating the output control signals for activating the programmable feedback voltage offset generator, the error amplifier current offset generator, and the feed-forward compensation circuit.

3. The control stage circuit of claim 2 wherein when a large line and/or load transient occurs at the input voltage terminal or the output terminal of the switch mode DC/DC power converter, one of the first or second comparators will be activated and the output terminal of the activated comparator will have a signal level of a first logic state and the output terminal of the deactivated comparator will have a signal level of a second logic level.

4. The control stage circuit of claim 3 wherein the output signal levels of the first and second comparators are decoded by a transient control circuit that determines if any line and/or load transient is a large increase or a large decrease.

5. The control stage circuit of claim 4 wherein the control loop monitor logic circuit generates output control signals for generating more or less offset voltage to change the offset of the feedback voltage.

6. The control stage circuit of claim 5 wherein the output control signals will modify the offset current of the error amplifier of the control stage circuit.

7. The control stage circuit of claim 2 wherein the programmable feedback offset generator comprises:
   a resistive voltage divider comprising:
      a first input terminal receiving the feedback signal,
      a second input terminal connected to the ground reference voltage source, a plurality of serially connected resistors wherein a first resistor of the plurality of serially connected resistors is connected to the first input terminal and a last resistor of the plurality of serially connected resistors is connected to the second input terminal, a first adjustable current source for selectively providing a first current to the resistive voltage divider for generating the offset feedback voltage of a first polarity comprising
 a first terminal connected to a power supply voltage source, and
 a control terminal connected to an output of the transient control circuit configured for adjusting the amplitude of the first current from the first adjustable current source;

a first offset control switch comprising:
 a first terminal connected to a second terminal of first adjustable current source,
 a second terminal connected to a third terminal of the resistive divider,
 a control terminal connected to an output of the transient control circuit configured for selectively connecting the second terminal of the first adjustable current source to the third terminal of the resistive divider for selectively providing the first current to the resistive divider for generating the offset feedback voltage;

a second adjustable current source for selectively providing a second current to the resistive voltage divider for generating the offset feedback voltage of a second polarity comprising
 a first terminal connected to a ground reference voltage source, and
 a control terminal connected to an output of the transient control circuit configured for adjusting the amplitude of the second current from the second adjustable current source;

a second offset control switch comprising:
 a first terminal connected to a second terminal of second adjustable current source,
 a second terminal connected to third terminal of the resistive divider,
 a control terminal connected to an output of the transient control circuit configured for selectively connecting the second terminal of the second adjustable current source to the third terminal of the resistive divider for selectively providing the second current to the resistive divider for generating the offset feedback voltage;

an output terminal for connecting to a junction of two resistors of the plurality of the serially connected resistors and to a non-inverting input of an error amplifier of the switch mode DC/DC power converter.

8. The control stage circuit of claim 2 wherein the programmable feedback offset generator comprises a plurality of switched offsetting current sources connected within the error amplifier wherein each of the plurality of offsetting current sources has a control terminal that permits a selected offsetting current source to be activated to modify a threshold value of the error amplifier to generate the offset feedback voltage to be generated.

9. The control stage circuit of claim 2 wherein the programmable feedback offset generator comprises:
an operational amplifier comprising:
 an inverting terminal connected for receiving the feedback voltage,
 a non-inverting terminal connected for receiving a reference voltage, and
 a differential amplifier for generating a difference signal from the feedback voltage and the reference voltage;

a transistor of a first conductivity type comprising:
 a gate connected to an output terminal of the operational amplifier for receiving the difference signal, and
 a source connected to the power supply voltage source;

a resistive voltage divider comprising:
 a first input terminal connected to a drain of the transistor of the first conductivity type for receiving a difference current generated by the transistor of the first conductivity type from the difference signal,
 a second input terminal connected to the ground reference voltage source,
 a plurality of serially connected resistors wherein a first resistor of the plurality of serially connected resistors is connected to the first input terminal and a last resistor of the plurality of serially connected resistors is connected to the second input terminal,
 a first adjustable current source for selectively providing a first current to the resistive voltage divider for generating the offset feedback voltage of a first polarity comprising
  a first terminal connected to a power supply voltage source, and
  a control terminal connected to an output of the transient control circuit configured for adjusting the amplitude of the first current from the first adjustable current source;

a first offset control switch comprising:
 a first terminal connected to a second terminal of first adjustable current source,
 a second terminal connected to a third terminal of the resistive divider,
 a control terminal connected to an output of the transient control circuit configured for selectively connecting the second terminal of the first adjustable current source to the third terminal of the resistive divider for selectively providing the first current to the resistive divider for generating the offset feedback voltage;

a second adjustable current source for selectively providing a second current to the resistive voltage divider for generating the offset feedback voltage of a second polarity comprising,
 a first terminal connected to a ground reference voltage source, and
 a control terminal connected to an output of the transient control circuit configured for adjusting the amplitude of the second current from the second adjustable current source;

a second offset control switch comprising:
 a first terminal connected to a second terminal of second adjustable current source,
 a second terminal connected to third terminal of the resistive divider,
 a control terminal connected to an output of the transient control circuit configured for selectively connecting the second terminal of the second adjustable current source to the third terminal of the resistive divider for selectively providing the second current to the resistive divider for generating the offset feedback voltage;

an output terminal for connecting to a junction of two resistors of the plurality of the serially connected resistors and to a non-inverting input of an error amplifier.

10. The control stage circuit of claim 2 wherein the programmable feedback offset generator comprises:
a first plurality of current sources, wherein each current source of the first plurality of current sources comprises:
a first terminal connected to a power supply voltage source;
a control terminal connected to an output of the transient control circuit configured for adjusting the amplitude of each current source of the first plurality of current sources;
a first plurality of control switches, wherein each control switch of the plurality of control switches comprises:
a first terminal connected to a second terminal of one of the first plurality of current sources,
a second terminal connected to the second terminal of one of the second plurality of control switches,
a control terminal connected to an output of the transient control circuit configured for selectively connecting the first terminal to the second terminal;
a second plurality of current sources, wherein each current source of the second plurality of current sources comprises:
a first terminal connected to a ground reference voltage source;
a control terminal connected to an output of the transient control circuit configured for adjusting the amplitude of each current source of the second plurality of current sources;
a second plurality of control switches, wherein each control switch of the plurality of control switches comprises:
a first terminal connected to a second terminal of one of the first plurality of current sources,
a second terminal connected to the second terminal of one of the first plurality of control switches
a control terminal connected to an output of the transient control circuit configured for selectively connecting the first terminal to the second terminal;
a serially connected plurality of resistors wherein a first terminal of a first resistor of the serially connected plurality of resistors is connected to the reference voltage source or to the feedback voltage and a second terminal of a last resistor of the multiple serially connected resistors is connected to one input of the error amplifier, and wherein second terminal of one control switch of the first plurality of control switches and a second terminal of one control switch of the second plurality of control switches is connected to the common connection of two resistors of the serially connected plurality of resistors and a control terminal of each of the first plurality of control switches and the control terminal of the second plurality of control switches permit a selected current source to be activated to offset the voltage level of the feedback voltage or the reference voltage.

11. The control stage circuit of claim 2 wherein the feed-forward compensation circuit comprises:
a plurality of feed-forward capacitors connected in parallel with a first terminal of each of the parallel connected plurality of feed-forward capacitors connected to an output of the control stage circuit and the output of a the error amplifier with in the control stage circuit;
a feed-forward finite gain amplifier having a non-inverter terminal receiving the reference voltage and an inverting terminal receiving the feedback signal;
a feed-forward compensation control circuit connected between the feed-forward amplifier and the plurality of feed-forward capacitors, wherein the feed-forward control circuit comprises:
a plurality of voltage sources comprising a first terminal and a second terminal connected to the ground reference voltage source, wherein a first voltage source of the plurality of voltage sources provides a maximum voltage that is equal to a maximum voltage level of an output of the feed-forward amplifier, a last voltage source that provides a minimum voltage level that is equal to a minimum voltage level of the output of the feed-forward amplifier, and the remaining voltage sources provide voltages provide middle voltage levels between the maximum voltage and the minimum voltage;
a first plurality of feed-forward switches, each of the of feed-forward switches comprising:
a first terminal connected to the output of the feed-forward operational amplifier,
a second terminal connect to the second terminal of one feed-forward capacitor of the plurality of feed-forward capacitors,
a control terminal connected to an output of the transient control circuit configured for selectively connecting the output of the feed-forward amplifier to one feed-forward capacitor of the plurality of feed-forward capacitors,
a second plurality of feed-forward switches, each of the of feed-forward switches comprising:
a first terminal connected to the first terminal of one of the voltage sources,
a second terminal connect to the second terminal of one feed-forward capacitor of the plurality of feed-forward capacitors,
a control terminal connected to an output of the transient control circuit configured for selectively connecting the first terminal of the one of the voltage source to one feed-forward capacitor of the plurality of feed-forward capacitors, capacitors.

12. The control stage circuit of claim 11 wherein the last voltage source is the ground reference voltage source.

13. A switch mode DC/DC power converter comprising:
a control stage circuit within a switch mode DC/DC power converter comprising:
a programmable feedback voltage offset generator configured for providing an offset voltage to the feedback voltage to generate an offset feedback voltage when the control loop monitor determines that the offset voltage is required to be provided to the feedback voltage for decreasing overshoot or undershoot of the output voltage of the switch mode DC/DC power converter;
an error amplifier current offset generator configured for generating offset current to be added to the output of the error amplifier;
a feed-forward compensation circuit configured for increasing the input range of the feed-forward amplifier output and the error amplifier output,
a control loop monitor connected to the programmable feedback voltage offset generator, the error amplifier current offset generator, and the feed-forward compensation circuit and configured for monitoring a difference between a feedback voltage developed from the output voltage of the switch mode DC/DC power converter and a positively offset reference voltage and a negatively offset reference voltage for determining if any line and/or load transient signal is an increase or a decrease in magnitude that will cause the overshoot or undershoot of the output voltage of the switch mode DC/DC power converter; and configured for generating output control signals for activating the programmable feedback voltage offset generator, the error amplifier current offset generator, and the feed-forward compensation circuit.

14. The switch mode DC/DC power converter of claim 13 wherein the control loop monitor comprises:
a first offset reference source comprising:
a negative terminal connected for receiving a first reference signal voltage;
a second offset reference source comprising:
a positive terminal connected for receiving the first reference signal voltage;
a first comparator comprising:
a non-inverting input terminal connected for receiving the feedback voltage,
an inverting input terminal connected to a positive terminal of the first offset reference source,
a first comparing circuit configured for determining when the feedback signal is greater than the magnitude of the additive combination of the feedback signal and the magnitude of the first reference source for generating a first transient detection signal of a first logic state;
a second comparator comprising:
a non-inverting input terminal connected for receiving the feedback signal,
an inverting input terminal connected to a negative terminal of the second offset reference source,
a second comparing circuit configured for determining when the feedback signal is greater than the magnitude of the subtractive combination of the feedback signal and the magnitude of the second reference source for generating a second transient detection signal of a first logic state; and
a transient control circuit in communication with the first and second comparing circuits configured for receiving the first and second transient detection signals, configured for determining if any line and/or load transient signal is an increase or a decrease in magnitude that will cause the overshoot or undershoot of the output voltage of the switch mode DC/DC power converter, and configured for generating output control signals for activating the programmable feedback voltage offset generator, the error amplifier current offset generator, and the feed-forward compensation circuit.

15. The switch mode DC/DC power converter of claim 14 wherein when a large line and/or load transient occurs at the input voltage terminal or the output terminal of the switch mode DC/DC power converter, one of the first or second comparators will be activated and the output terminal of the activated comparator will have a signal level of a first logic state and the output terminal of the deactivated comparator will have a signal level of a second logic level.

16. The switch mode DC/DC power converter of claim 15 wherein the output signal levels of the first and second comparators are decoded by a transient control logic circuit that determines if any line and/or load transient is a large increase or a large decrease.

17. The switch mode DC/DC power converter of claim 16 wherein the control loop monitor logic circuit generates output control signals for generating more or less offset voltage to change the offset of the feedback voltage.

18. The switch mode DC/DC power converter of claim 17 wherein the output control signals will modify the offset current of the error amplifier of the control stage circuit.

19. The switch mode DC/DC power converter of claim 14 wherein the programmable feedback offset generator comprises:
a resistive voltage divider comprising:
a first input terminal receiving the feedback signal,
a second input terminal connected to the ground reference voltage source,
a plurality of serially connected resistors wherein a first resistor of the plurality of serially connected resistors is connected to the first input terminal and a last resistor of the plurality of serially connected resistors is connected to the second input terminal,
a first adjustable current source for selectively providing a first current to the resistive voltage divider for generating the offset feedback voltage of a first polarity comprising
a first terminal connected to a power supply voltage source, and
a control terminal connected to an output of the transient control circuit configured for adjusting the amplitude of the first current from the first adjustable current source;
a first offset control switch comprising:
a first terminal connected to a second terminal of first adjustable current source,
a second terminal connected to a third terminal of the resistive divider,
a control terminal connected to an output of the transient control circuit configured for selectively connecting the second terminal of the first adjustable current source to the third terminal of the resistive divider for selectively providing the first current to the resistive divider for generating the offset feedback voltage;
a second adjustable current source for selectively providing a second current to the resistive voltage divider for generating the offset feedback voltage of a second polarity comprising
a first terminal connected to a ground reference voltage source, and
a control terminal connected to an output of the transient control circuit configured for adjusting the amplitude of the second current from the second adjustable current source;
a second offset control switch comprising:
a first terminal connected to a second terminal of second adjustable current source,
a second terminal connected to third terminal of the resistive divider,
a control terminal connected to an output of the transient control circuit configured for selectively connecting the second terminal of the second adjustable current source to the third terminal of the resistive divider for selectively providing the second current to the resistive divider for generating the offset feedback voltage;
an output terminal for connecting to a junction of two resistors of the plurality of the serially connected resistors and to a non-inverting input of an error amplifier.

20. The switch mode DC/DC power converter of claim 14 wherein the programmable feedback offset generator comprises a plurality of switched offsetting current sources connected within the error amplifier wherein each of the plurality of offsetting current sources has a control terminal that permits a selected offsetting current source to be activated to modify a threshold value of the error amplifier to generate the offset feedback voltage to be generated.

21. The switch mode DC/DC power converter of claim 14 wherein the programmable feedback offset generator comprises:
  an operational amplifier comprising:
    an inverting terminal connected for receiving the feedback voltage,
    a non-inverting terminal connected for receiving a reference voltage, and
    a differential amplifier for generating a difference signal from the feedback voltage and the reference voltage;
  a transistor of a first conductivity type comprising:
    a gate connected to an output terminal of the operational amplifier for receiving the difference signal, and
    a source connected to the power supply voltage source;
  a resistive voltage divider comprising:
    a first input terminal connected to a drain of the transistor of the first conductivity type for receiving a difference current generated by the transistor of the first conductivity type from the difference signal,
    a second input terminal connected to the ground reference voltage source,
    a plurality of serially connected resistors wherein a first resistor of the plurality of serially connected resistors is connected to the first input terminal and a last resistor of the plurality of serially connected resistors is connected to the second input terminal,
    a first adjustable current source for selectively providing a first current to the resistive voltage divider for generating the offset feedback voltage of a first polarity comprising
      a first terminal connected to a power supply voltage source, and
      a control terminal connected to an output of the transient control circuit configured for adjusting the amplitude of the first current from the first adjustable current source;
    a first offset control switch comprising:
      a first terminal connected to a second terminal of first adjustable current source,
      a second terminal connected to a third terminal of the resistive divider,
      a control terminal connected to an output of the transient control circuit configured for selectively connecting the second terminal of the first adjustable current source to the third terminal of the resistive divider for selectively providing the first current to the resistive divider for generating the offset feedback voltage;
    a second adjustable current source for selectively providing a second current to the resistive voltage divider for generating the offset feedback voltage of a second polarity comprising
      a first terminal connected to a ground reference voltage source, and
      a control terminal connected to an output of the transient control circuit configured for adjusting the amplitude of the second current from the second adjustable current source;
    a second offset control switch comprising:
      a first terminal connected to a second terminal of second adjustable current source,
      a second terminal connected to third terminal of the resistive divider,
      a control terminal connected to an output of the transient control circuit configured for selectively connecting the second terminal of the second adjustable current source to the third terminal of the resistive divider for selectively providing the second current to the resistive divider for generating the offset feedback voltage;
  an output terminal for connecting a junction of two resistors of the plurality of the serially connected resistors and to a non-inverting input of an error amplifier.

22. The switch mode DC/DC power converter of claim 14 wherein the programmable feedback offset generator comprises:
  a first plurality of current sources, wherein each current source of the first plurality of current sources comprises:
    a first terminal connected to a power supply voltage source;
    a control terminal connected to an output of the transient control circuit configured for adjusting the amplitude of each current source of the first plurality of current sources;
  a first plurality of control switches, wherein each control switch of the plurality of control switches comprises:
    a first terminal connected to a second terminal of one of the first plurality of current sources,
    a second terminal connected to the second terminal of one of the second plurality of control switches,
    a control terminal connected to an output of the transient control circuit configured for selectively connecting the first terminal to the second terminal;
  a second plurality of current sources, wherein each current source of the second plurality of current sources comprises:
    a first terminal connected to a ground reference voltage source;
    a control terminal connected to an output of the transient control circuit configured for adjusting the amplitude of each current source of the second plurality of current sources;
  a second plurality of control switches, wherein each control switch of the plurality of control switches comprises:
    a first terminal connected to a second terminal of one of the first plurality of current sources,
    a second terminal connected to the second terminal of one of the first plurality of control switches,
    a control terminal connected to an output of the transient control circuit configured for selectively connecting the first terminal to the second terminal;
  a serially connected plurality of resistors wherein a first terminal of a first resistor of the serially connected plurality of resistors is connected to the reference voltage source or to the feedback voltage and a second terminal of a last resistor of the multiple serially connected resistors is connected to one input of the error amplifier, and wherein second terminal of one control switch of the first plurality of control switches and a second terminal of one control switch of the second plurality of control switches is connected to the common connection of two resistors of the serially connected plurality of resistors and a control terminal of each of the first plurality of control switches and the control terminal of the second plurality of control switches permit a selected current source to be activated to offset the voltage level of the feedback voltage or the reference voltage.

23. The switch mode DC/DC power converter of claim 14 wherein the feed-forward compensation circuit comprises:
a plurality of feed-forward capacitors connected in parallel with a first terminal of each of the parallel connected plurality of feed-forward capacitors connected to an output of the control stage circuit and the output of a the error amplifier with in the control stage circuit;
a feed-forward amplifier having a non-inverting terminal receiving the reference voltage and an inverting terminal receiving the feedback signal;
a feed-forward compensation control circuit connected between the feed-forward amplifier and the plurality of feed-forward capacitors, wherein the feed-forward control circuit comprises:
a plurality of voltage sources comprising a first terminal and a second terminal connected to the ground reference voltage source, wherein a first voltage source of the plurality of voltage sources provides a maximum voltage that is equal to a maximum voltage level of an output of the feed-forward amplifier, a last voltage source that provides a minimum voltage level that is equal to a minimum voltage level of the output of the feed-forward amplifier, and the remaining voltage sources provide voltages provide middle voltage levels between the maximum voltage and the minimum voltage;
a first plurality of feed-forward switches, each of the of feed-forward switches comprising:
a first terminal connected to the output of the feed-forward amplifier,
a second terminal connect to the second terminal of one feed-forward capacitor of the plurality of feed-forward capacitors,
a control terminal connected to an output of the transient control circuit configured for selectively connecting the output of the feed-forward amplifier to one feed-forward capacitor of the plurality of feed-forward capacitors,
a second plurality of feed-forward switches, each of the of feed-forward switches comprising:
a first terminal connected to the first terminal of one of the voltage sources,
a second terminal connect to the second terminal of one feed-forward capacitor of the plurality of feed-forward capacitors,
a control terminal connected to an output of the transient control circuit configured for selectively connecting the first terminal of the one of the voltage source to one feed-forward capacitor of the plurality of feed-forward capacitors, capacitors.

24. The switch mode DC/DC power converter of claim 23 wherein the last voltage source is the ground reference voltage source.

25. A method for improving the large signal response of control stage circuit of a switch mode DC/DC power converter comprises the steps of:
increasing the differential input range of an error amplifier of the control stage circuit by the steps of:
determining a difference between a feedback voltage developed from an output of the switch mode DC/DC power converter and a positively offset reference voltage and a negatively offset reference voltage for determining if any line and/or load transient signal is an increase or a decrease in magnitude that will cause the overshoot or undershoot of the output voltage of the switch mode DC/DC power converter;
determining that a transient has occurred at the input terminal or output terminal of the switch mode DC/DC power converter from the difference of the between a feedback voltage developed from the output voltage and a positively offset reference voltage and a negatively offset reference voltage;
offsetting the feedback voltage developed from the output voltage into multiple segments by multiple offset voltages to prevent saturation of the control stage circuit when a transient signal that will cause the overshoot or undershoot of the output voltage of the switch mode DC/DC power converter is received;
adding counteracting offset voltages to an output of an error amplifier of the control stage circuit configured for maintaining the output voltage of the error amplifier to prevent overshoot or undershoot;
generating a feed-forward compensation signal with the amplitude of the signal being clamped to at least one fixed voltage level between a minimum and a maximum amplitude of the feed-forward compensation signal; and
adding the feed-forward compensation signal to the output of the error amplifier to produce an output error signal of the control stage circuit configured for controlling the modulating of the input power voltage of the switch mode DC/DC power converter.

* * * * *